(12) United States Patent
Portz et al.

(10) Patent No.: US 11,770,451 B2
(45) Date of Patent: *Sep. 26, 2023

(54) SYSTEM AND METHOD FOR AUTOMATIC BLOCK STORAGE VOLUME TIER TUNING

(71) Applicant: ORACLE INTERNATIONAL CORPORATION, Redwood Shores, CA (US)

(72) Inventors: Travis Portz, Seattle, WA (US); Jeppe Larsen, Seattle, WA (US); Bharath Mysore Nanjundappa, Seattle, WA (US); Max Verun, Seattle, WA (US); Mario Tayah, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,770

(22) Filed: Jul. 6, 2022

(65) Prior Publication Data

US 2022/0337662 A1 Oct. 20, 2022

Related U.S. Application Data

(63) Continuation of application No. 17/145,112, filed on Jan. 8, 2021, now Pat. No. 11,412,043, which is a (Continued)

(51) Int. Cl.
*H04L 67/1097* (2022.01)
*H04L 67/568* (2022.01)

(52) U.S. Cl.
CPC ........ *H04L 67/1097* (2013.01); *H04L 67/568* (2022.05)

(58) Field of Classification Search
CPC ... H04L 47/70–47/781; H04L 41/08–41/0896; H04L 67/1091–67/125; H04L 67/56–67/59
See application file for complete search history.

(56) References Cited

U.S. PATENT DOCUMENTS 9,495,486 B1 * 11/2016 Aluru ..................... G06F 30/20
10,191,773 B2    1/2019 Wires
(Continued)

OTHER PUBLICATIONS

Ping Chen et al., "Research On Tiered Storage Method For Big Data Of Virtual Information Based On Cloud Computing", 2019 International Conference on Smart Grid and Electrical Automation (ICSGEA), © 2019, pp. 308-311.
(Continued)

*Primary Examiner* — Clayton R Williams
(74) *Attorney, Agent, or Firm* — TUCKER ELLIS LLP

(57) ABSTRACT

In accordance with an embodiment, described herein are systems and methods for automatic block storage volume tuning by simulating usage characteristics for data/block volumes. The block storage performance associated with usage by a cloud instance of a block volume can be simulated, and the manner in which data is stored or cached, for example within a combination of SSD/NVMe block storage and/or HDD object storage, can be automatically adjusted, for example to associate the block volume with a particular volume performance tier. The described approach allows the system to tune block volume performance in a dynamic manner, without further manual input from a user—the volume performance can be automatically increased when the user needs it, and otherwise reduced down to save costs (both for the user and the cloud provider). A user can enable tuning on a particular block volume, and thereafter automatically receive appropriate price/performance characteristics.

15 Claims, 30 Drawing Sheets

Related U.S. Application Data continuation-in-part of application No. 17/018,984, filed on Sep. 11, 2020.

(60) Provisional application No. 62/900,404, filed on Sep. 13, 2019.

(56) References Cited

U.S. PATENT DOCUMENTS

| | | | |
|---|---|---|---|
| 10,235,055 B1* | 3/2019 | Saad | G06F 3/0653 |
| 10,545,927 B2 | 1/2020 | Strauss | |
| 10,628,074 B2 | 4/2020 | Roberts | |
| 10,949,359 B2 | 3/2021 | Martin | |
| 10,977,180 B2 | 4/2021 | Yochai | |
| 11,412,043 B2 | 8/2022 | Portz | |
| 2016/0034394 A1* | 2/2016 | McKean | G06F 12/0891 709/217 |
| 2016/0150003 A1* | 5/2016 | Magdon-Ismail | G06F 9/45558 709/223 |
| 2017/0235609 A1 | 8/2017 | Wires | |
| 2017/0277715 A1 | 9/2017 | Strauss | |
| 2019/0324921 A1 | 10/2019 | Martin | |
| 2019/0334770 A1* | 10/2019 | Xiang | H04L 41/5009 |
| 2020/0042228 A1 | 2/2020 | Roberts | |
| 2020/0174842 A1* | 6/2020 | Wang | H04L 67/63 |
| 2021/0004329 A1 | 1/2021 | Yochai | |
| 2021/0081111 A1 | 3/2021 | Larsen | |
| 2021/0160317 A1 | 5/2021 | Portz | |

OTHER PUBLICATIONS

Hironori Emaru et al., "Performance Management for the Dynamic Storage Tiering by Virtual Volume Clustering", 2011 Fourth IEEE International Conference on Utility and Cloud Computing, © 2011, pp. 451-456.

Sixiang Ma et al., "MOBBS: A Multi-tiered Block Storage System for Virtual Machines using Object-based Storage", 2014 IEEE International Conference on High Performance Computing and Communications (HPCC), 2014 IEEE 6th International Symposium on Cyberspace Safety and Security (CSS) and 2014 IEEE 11th International Conference on Embedded Software and Systems (ICESS), © 2014 IEEE, pp. 272-275.

Zhengyu Yang et al., "AutoTiering: Automatic Data Placement Manager in Multi-Tier All-Flash Datacenter", IEEE International Conference on Performance, Computing and Communications (IPCCC), © 2017 IEEE, 8 pages.

Darrell Long et al., "Predicting Future File-System Actions From Prior Events", 1996, Research Gate, pp. 1-10.

Jinhwan Choi et al., "Learning-Based Dynamic Cache Management in a Cloud", Feb. 2, 2019, Texas A&M University, 13 pages.

Sithole, Ernest et al., "Cache performance models for quality of service compliance in storage clouds" Journal of Cloud Computing: Advance, Systems and Applications 2013, 24 pages.

Barr, Jeff, AWS News Blog, Amazon EC2, Launch News, "Amazon EBS Update-New Elastic Volumes Change Everything" Feb. 13, 2017, 4 pages, retrieved from: <https://aws.amazon.com/blogs/aws/amazon-ebs-update-new-elastic-volumes-change-everything/>.

Verun, Max "Elastic Performance with the Next Generation Block Storage on Oracle Cloud" Oracle Cloud Infrastructure Blog, Nov. 14, 2019, 4 pages.

Verun, Max "Auto-tune Detached Block Volumes for Cost Savings" Oracle Cloud Infrastructure Blog, Jul. 28, 2020, 5 pages.

Khabazan, Mona "Cloud storage without compromise" Oracle Cloud Infrastructure Blog, Apr. 29, 2021, 5 pages.

United States Patent and Trademark Office, Office Communication dated Oct. 7, 2022 for U.S. Appl. No. 17/018,984, 8 pages.

United States Patent and Trademark Office, Notice of Allowance and Fee(s) Due dated Mar. 15, 2023 for U.S. Appl. No. 17/018,984, 6 pages.

United States Patent and Trademark Office, Notice of Allowance and Fee(s) Due dated Mar. 8, 2023 for U.S. Appl. No. 17/018,984, 9 pages.

* cited by examiner

SYSTEM AND METHOD FOR AUTOMATIC BLOCK STORAGE VOLUME TIER TUNING

CROSS-REFERENCE TO RELATED APPLICATIONS

This application is a continuation of U.S. patent application titled "SYSTEM AND METHOD FOR AUTOMATIC BLOCK STORAGE VOLUME TIER TUNING", application Ser. No. 17/145,112, filed Jan. 8, 2021; which application is related to and is a continuation-in-part of U.S. patent application titled "SYSTEM AND METHOD FOR TIERED DATA STORAGE IN A CLOUD INFRASTRUCTURE ENVIRONMENT", application Ser. No. 17/018,984, filed Sep. 11, 2020, which claims the benefit of priority to U.S. Provisional Patent application titled "SYSTEM AND METHOD FOR TIERED BLOCK STORAGE", Application No. 62/900,404, filed Sep. 13, 2019; each of which above applications are herein incorporated by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally directed to cloud infrastructure environments, and are particularly directed to systems and methods for performing automatic block storage volume tuning by simulating usage characteristics for data/block volumes.

BACKGROUND

Cloud infrastructure and other types of cloud computing environments provide access to cloud services that enable customers to build and run software applications and services in a highly-available hosted environment.

For example, an Infrastructure-as-a-Service (IaaS) model enables a cloud provider to host infrastructure components or resources, which in a traditional setting might have been installed on-premise at a customer's location. Examples of such infrastructure components can include hardware resources, for example, data warehouses, data centers, computer servers, data storage devices, or networking hardware; and software resources, for example, virtualization software.

Enterprise customers may seek different data storage options, each of which are generally associated with a range of costs, to achieve desired data performance and availability for various types of data and applications.

Although on-premise storage area network devices may offer flexible configurations, such devices are generally constrained to operating at a rack level, impacting capacity, scalability, and availability. Cloud providers can operate at a regional level, providing higher scalability and availability, but generally offer specific storage options, with disjoint capabilities and undesirable friction when moving data between the different options.

SUMMARY

In accordance with an embodiment, described herein are systems and methods for automatic block storage volume tuning by simulating usage characteristics for data/block volumes. The block storage performance associated with usage by a cloud instance of a block volume can be simulated, and the manner in which data is stored or cached, for example within a combination of SSD/NVMe block storage and/or HDD object storage, can be automatically adjusted, for example to associate the block volume with a particular volume performance tier. The described approach allows the system to tune block volume performance in a dynamic manner, without further manual input from a user—the volume performance can be automatically increased when the user needs it, and otherwise reduced down to save costs (both for the user and the cloud provider). A user can enable tuning on a particular block volume, and thereafter automatically receive appropriate price/performance characteristics.

DETAILED DESCRIPTION

Figure 1:
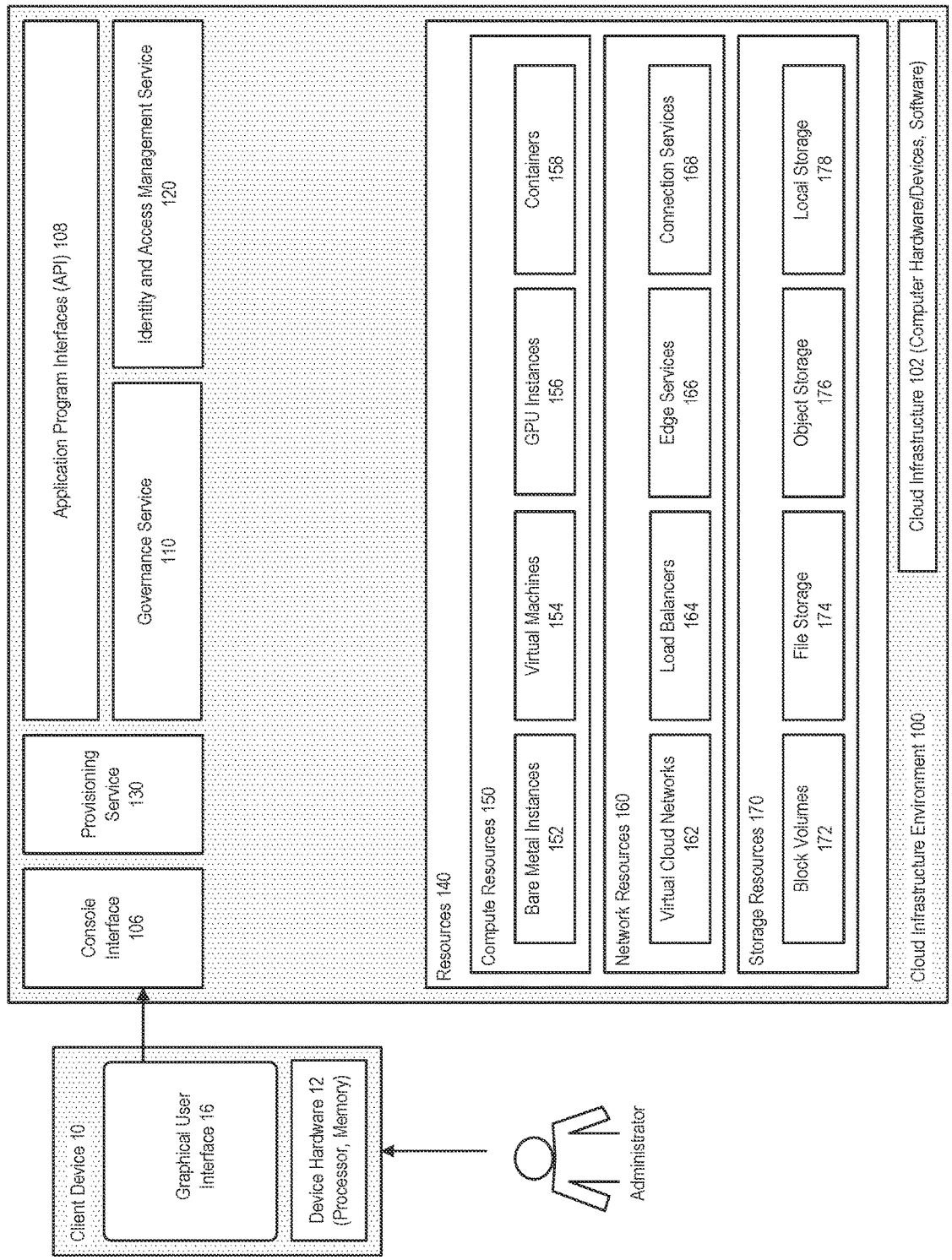
FIG. 1 illustrates an example cloud infrastructure environment, in accordance with an embodiment.

As described above, cloud infrastructure environments, such as for example Oracle Cloud Infrastructure (OCI) environments, provide access to cloud services that enable customers (users) to build and run applications and services in a highly-available hosted environment. An Infrastructure-as-a-Service (IaaS) model enables a cloud provider to host infrastructure components or resources which in a traditional setting might have been installed on-premise at a customer's location. Examples of such infrastructure components can include hardware resources, for example, data warehouses, data centers, computer servers, data storage devices, or networking hardware; and software resources, for example, virtualization software.

As also described above, enterprise customers may seek different data storage options to achieve desired data performance and availability for various types of data and applications, at suitable cost. Although on-premise storage area network devices offer flexible configurations, such devices are generally constrained to operating at a rack level, impacting capacity, scalability, and availability. Cloud providers can operate at a regional level, providing higher scalability and availability, but generally offer specific storage options, with disjoint capabilities and undesirable friction when moving data between the different options.

In accordance with an embodiment, described herein are systems and methods for providing tiered data storage in cloud infrastructure environments. A data storage service (block store) is adapted to automatically adjust the manner by which the data for a data volume or block volume (data/block volume), associated with a cloud instance, can be stored to meet the requirements of a volume performance tier.

In accordance with an embodiment, responsive to selection of a particular performance tier, the storage of the data/block volume can be allocated between a first type of data storage associated with a first performance characteristics; and a second type of data storage associated with a second performance characteristics.

In accordance with an embodiment, the system can incorporate or use features or processes that are provided within a cloud infrastructure environment and that operate with various types of data storage devices to create backups associated with data/block volumes and/or restore to restore data from such backups, to control to which data storage devices the data for a particular data/block volume should be stored, to meet a desired performance requirement.

For example, in accordance with an embodiment, the data storage service (block store) can automatically adjust the storage of data for a data/block volume, which is associated with a cloud instance across performance tiers, by allocating storage of data between a first type of data storage and performance tier, such as solid-state drive (SSD), non-volatile memory express (NVMe), or block storage; and a second type of data storage and performance tier, such as hard disk drive (HDD), or object storage.

In accordance with an embodiment, a data storage service (block store) can store the data associated with a particular data/block volume as multiple replicas, to one or more data storage devices. Data writes can be sent to all of the replicas provided at the data storage device. Data reads can be processed by any one of those replicas at the data storage device. In such an environment, a data storage device such as an SSD/NVMe device may provide higher performance. However, the need for higher performance storage is generally more pertinent when an associated cloud instance needs immediate access to the data in the data/block volume; and is generally less pertinent when the associated cloud instance does not need such immediate access to the data, for example when the data/block volume is detached from the cloud instance. In such a scenario, the use of an SSD/NVMe device to store all of the replicas associated with the data/block volume would typically result in a higher cost, both to the cloud provider and the customer, and ultimately may not provide much difference in overall data performance.

In accordance with an embodiment, to address scenarios such as the above, the system enables a portion or all of the data storage associated with a particular data/block volume, which for example might have been stored/cached as replicas in an SSD/NVMe device, to be instead stored in a different storage device, for example an HDD device, which may have lesser performance characteristics but is more cost-effective, both for the cloud provider and customer. For example, in a cloud infrastructure environment that utilizes a combination of block storage and object storage, the system enables some of the data storage associated with a particular data/block volume to be adjusted from being stored in block storage, to being store instead in object storage.

In accordance with an embodiment, the system can determine which data storage devices to use, to meet a particular performance requirement, for example using a caching process to determine a cache fraction or otherwise determine which data associated with a particular data/block volume should be considered "hot" from the customer's perspective, for which it may be appropriate to retain or cache that data in a high-performance storage device, for example an SSD/NVMe device or block storage; or which other data associated with a particular data/block volume should be considered "cold" from the customer's perspective, for which it may be appropriate to move that data to a lower-performance storage device, for example an HDD device or object storage.

In accordance with an embodiment, the caching process can use a least-recently-used (LRU) or other caching policy to determine which data/block volumes, or portions of data stored therein, are considered "hot" or "cold". In such an environment, the data associated with a particular data/block volume can be written as usual, for example to an SSD/NVMe device or block storage. When the data associated with a particular data/block volume subsequently becomes "cold", it can be evicted from the SSD/NVMe device or block storage, and written HDD device or object storage. Any new writes to those data/block volumes can be uploaded to the appropriate, e.g., object storage as needed.

In accordance with an embodiment, the system can accommodate the particular example of when a particular data/block volumes should be considered "cold" due to the data/block volume being detached from an associated cloud instance. For example, if the cloud instance is not attached to the data/block volume, then the entire data/block volume can be consider "cold" and evicted as appropriate. Such a determination can be used to support, for example, a lower performance tier for detached data/block volumes options. In other scenarios, some or all of the data/block volumes, or portions of data stored therein may be considered "hot" or "cold", and an assessment can be made on a data-usage basis.

In accordance with an embodiment, the system can provide to customers the opportunity to trade off cost of data storage versus performance; while at the back-end, the storage of the data can be distributed across different storage mechanisms, to meet the cost and performance expectations of the customer. For example, in accordance with an embodiment, a graphical user interface enables configuring data/block volumes to use particular performance tiers, and/or to support automatic tuning; and the system can accommodate such preferences.

In accordance with an embodiment, various technical advantages of the described approach include that the systems and methods described herein provides advantages of a storage area network, such as the ability to dynamically adjust the storage of data/block volume performance; together with advantages of a cloud infrastructure environment, such as highly-available data storage and the ability to scale data storage independently based on demand.

Cloud Infrastructure Environment

FIG. 1 illustrates an example cloud infrastructure environment, in accordance with an embodiment.

As illustrated in FIG. 1, in accordance with an embodiment, a cloud infrastructure environment 100 can be provided as a system that operates on a cloud infrastructure 102 comprising hardware (e.g., processor, memory), and software resources, and further comprising, for example, one or more of a console interface 106, application program interface (API) 108, governance service 110, identity and access management service 120, and/or provisioning service 130.

In accordance with an embodiment, the cloud infrastructure environment provides access to shared cloud infrastructure resources 140 via, for example, a compute resources layer 150, a network resources layer 160, and/or a storage resources layer 170.

In accordance with an embodiment, a client device, such as a computing device 10 having a device hardware 12 (e.g., processor, memory), and graphical user interface 16, can communicate with the cloud infrastructure environment via a network such as, for example, a wide area network, local area network, or the Internet.

In accordance with an embodiment, a tenancy can be created for each customer, which provides a secure and isolated partition within the cloud infrastructure environment within which the customer can create, organize, and administer their cloud resources.

In accordance with an embodiment, the console interface and API provide customers with access to, and control over, respective portions of the cloud infrastructure environment. For example, the client device and graphical user interface enables customers to create and manage resources, cloud instances, cloud networks, and data/block volumes, or manage users and permissions within the customer scope. In accordance with an embodiment, the API can comprise, for example, a REST API that enables a client device to communicated with the cloud infrastructure environment via, e.g., HTTP or HTTPS.

In accordance with an embodiment, the console interface or API can be provided by a configuration management tool (e.g., Ansible), which can be used for provisioning, orchestration, and configuration management. Such configuration management tools allow customers to automate deploying and updating software assets, and orchestrating complex operational processes.

In accordance with an embodiment, the governance service provides tools to help customers enable resource governance, manage costs, and control access to the cloud infrastructure. For example, the governance service allows customers to apply tags to their resources, for informational or operational reasons. The governance service can log events that can later be retrieved, stored, and analyzed for security, compliance, or resource optimization across cloud infrastructure entitlements and compartments.

In accordance with an embodiment, the identity and access management service can create a user profile for each customer/user and associated with a user credential (e.g., username and password), which can then allow for single-sign-on to the cloud infrastructure service or access to additional cloud services.

In accordance with an embodiment, the provisioning service can be used to provision a tenancy within the cloud infrastructure environment, for use with the shared cloud infrastructure resources. The provisioning service can be accessed and controlled through the console interface, or an API, which enables customers to provision and manage compute hosts, generally referred to herein in some embodiments as cloud instances.

Customers can then launch cloud instances as needed, to meet compute and application requirements. After a customer provisions and launches a cloud instance, the provisioned cloud instance can be accessed from, for example, a client device. The provisioning service also enables restarting a cloud instance, attaching and detaching data/block volumes from a cloud instance, and terminating a cloud instance.

In accordance with an embodiment, the compute resources layer can comprise resources, such as, for example, bare metal cloud instances 152, virtual machines 154, GPU cloud instances 156, and/or containers 158.

The compute resources layer can be used to, for example, provision and manage bare metal compute cloud instances, or provision cloud instances as needed to deploy and run applications, as in an on-premises data center. For example, in accordance with an embodiment, the cloud infrastructure environment can provide control of physical host ("bare metal") machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the cloud infrastructure environment can comprise graphical processing unit (GPU) compute cloud instances within the compute resources layer. Since accelerated computing requires consistently-fast infrastructure across every service, the use of such GPU cloud instances enables customers to process and analyze massive data sets more efficiently, making them useful, for example, for complex machine learning (ML), artificial intelligence (AI) algorithms.

In accordance with an embodiment, the cloud infrastructure environment can provide containerized compute cloud instances within the compute resources layer. A container engine service can be used to build and launch containerized applications or cloud-native applications. A container service can specify the compute resources that the containerized application requires, and the container engine can then provision, via the provisioning service, the required compute resources.

In accordance with an embodiment, the network resources layer can comprise a number of network-related resources, such as, for example, virtual cloud networks (VCNs) 162, load balancers 164, edge services 166, and/or connection services 168.

In accordance with an embodiment, a virtual cloud network can comprise a virtual version of a traditional network, including subnets, route tables, and gateways, on which customer cloud instances can run. Generally, a cloud network resides within a single region, and includes the region's availability domains. Each subnet defined in the cloud network can either be in a single availability domain, or span the availability domains in the region.

In accordance with an embodiment, the cloud infrastructure environment can provide load balancers at the networking resources layer. A load balancing service can provide automated traffic distribution from one entry point to multiple servers reachable from a virtual cloud network (VCN), and can improve resource utilization, scaling, and help ensure high availability. In accordance with an embodiment, if a region includes only one availability domain, the service requires just one subnet, either regional or AD-specific, to host both the primary and standby load balancers.

In accordance with an embodiment, the edge services comprise services that allow customers to manage, secure, and maintain domains and endpoints. These include, for example, DNS (domain name system), DDoS (distributed denial of service) protection, and email delivery. These services enable customers to optimize performance, thwart cyberattacks, and scale communication.

In accordance with an embodiment, connection services provide an easy way to create a dedicated, private connection between a customer data center or existing network and the cloud infrastructure environment. The connection service can provide high bandwidth, and a reliable and consistent network.

In accordance with an embodiment, the storage resources layer can comprise a number of resources, such as, for example, data/block volumes 172, file storage 174, object storage 176, and/or local storage 178.

In accordance with an embodiment, data/block volumes provide high-performance network storage capacity that supports a broad range of I/O intensive workloads. Customers can use data/block volumes, for example, to expand the storage capacity of compute cloud instances, to provide durable and persistent data storage that can be migrated across compute cloud instances, or to host large databases.

For example, in accordance with an embodiment, file storage allows customers to create a scalable, distributed, enterprise-grade network file system. File storage supports semantics, snapshots capabilities, and data at-rest encryption. Object storage provides high throughput storage for unstructured data, and enables near limitless storage capacity for large amounts of analytic data, or rich content like images and videos. Data/block volumes can be backed up to object storage for added durability. Local storage can provide, for example, high speed and reliable storage in the form of solid state drives, for I/O intensive applications. These can be provided, for example, within bare metal cloud instances. Local storage provides high storage performance for VM's and bare metal compute cloud instances; and are particularly useful, for example, when use with relational databases, data warehousing, big data, analytics, AI applications.

Tiered Data Storage

Figure 2:
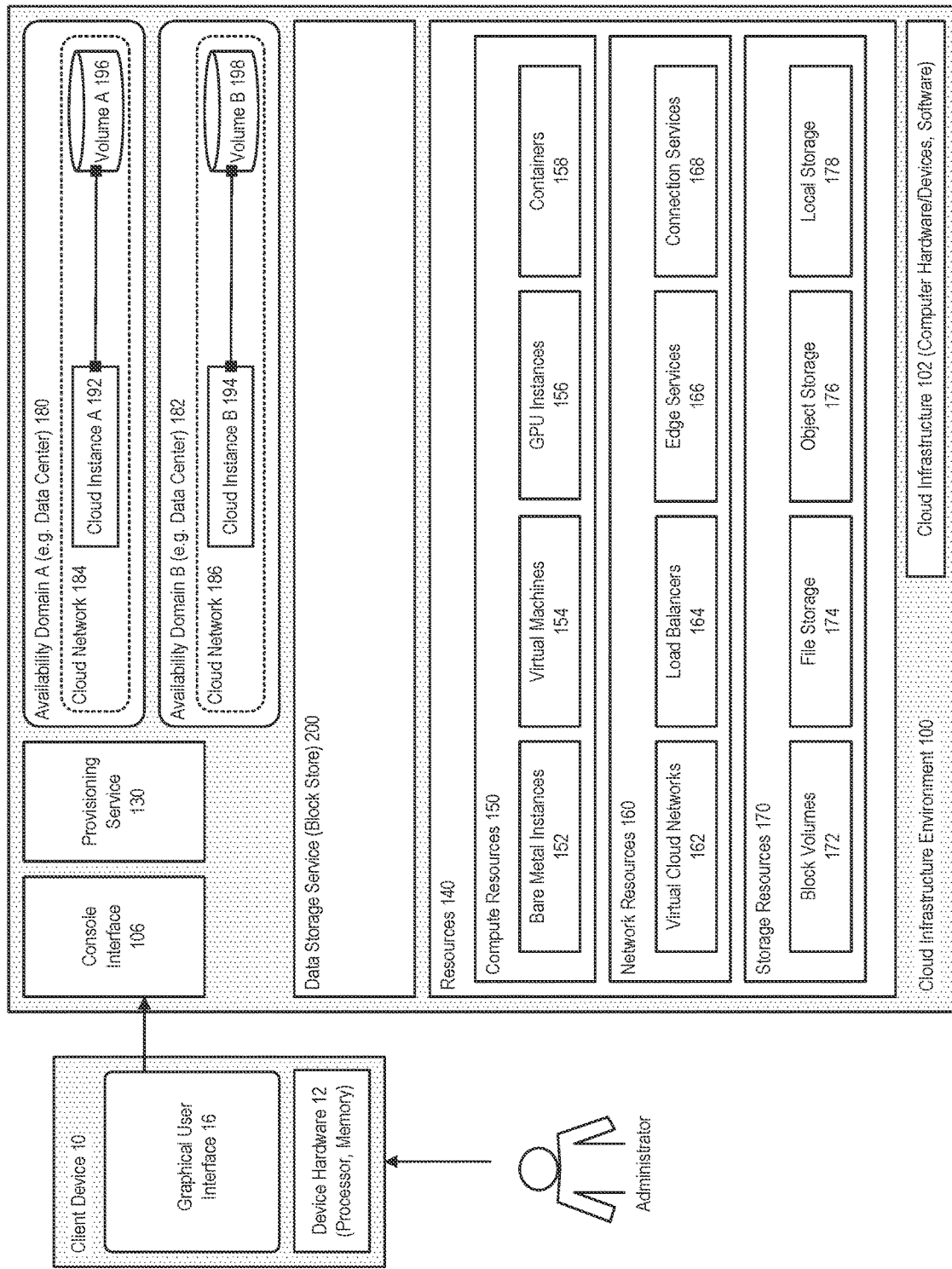
FIG. 2 further illustrates an example cloud infrastructure environment, including the use of availability domains, cloud networks, cloud instances, and data/block volumes, in accordance with an embodiment.

FIG. 2 further illustrates an example cloud infrastructure environment, including the use of availability domains, cloud networks, cloud instances, and data/block volumes, in accordance with an embodiment.

As illustrated in FIG. 2, the cloud infrastructure environment supports the use of availability domains, such as for example availability domains A 180, and availability domains A B 182, which enables customers to create and access cloud networks 184, 186, and run cloud instances A 192, B 194, which can be connected respectively to data/block volumes A 196, B 198. A customer can access an availability domain and a cloud network to access each of their cloud instances and its associated data/block volume.

In accordance with an embodiment, access to the resources of the cloud infrastructure environment, including its storage resources can be provided by a data storage service (block store) 200, as further described in detail below.

In accordance with an embodiment, a variety of different storage classes or tiers can be offered, for example to support both a more-frequently accessed performant storage; and a less-frequently accessed archive storage. The use of storage tiers enables a customer/user to maximize performance, while reducing costs. For example, a user may choose to use archive storage for data which they seldom or rarely access, but that must be retained and preserved for long periods of time; and a more performant object storage for data which they need fast, immediate, and frequent access.

Figure 3:
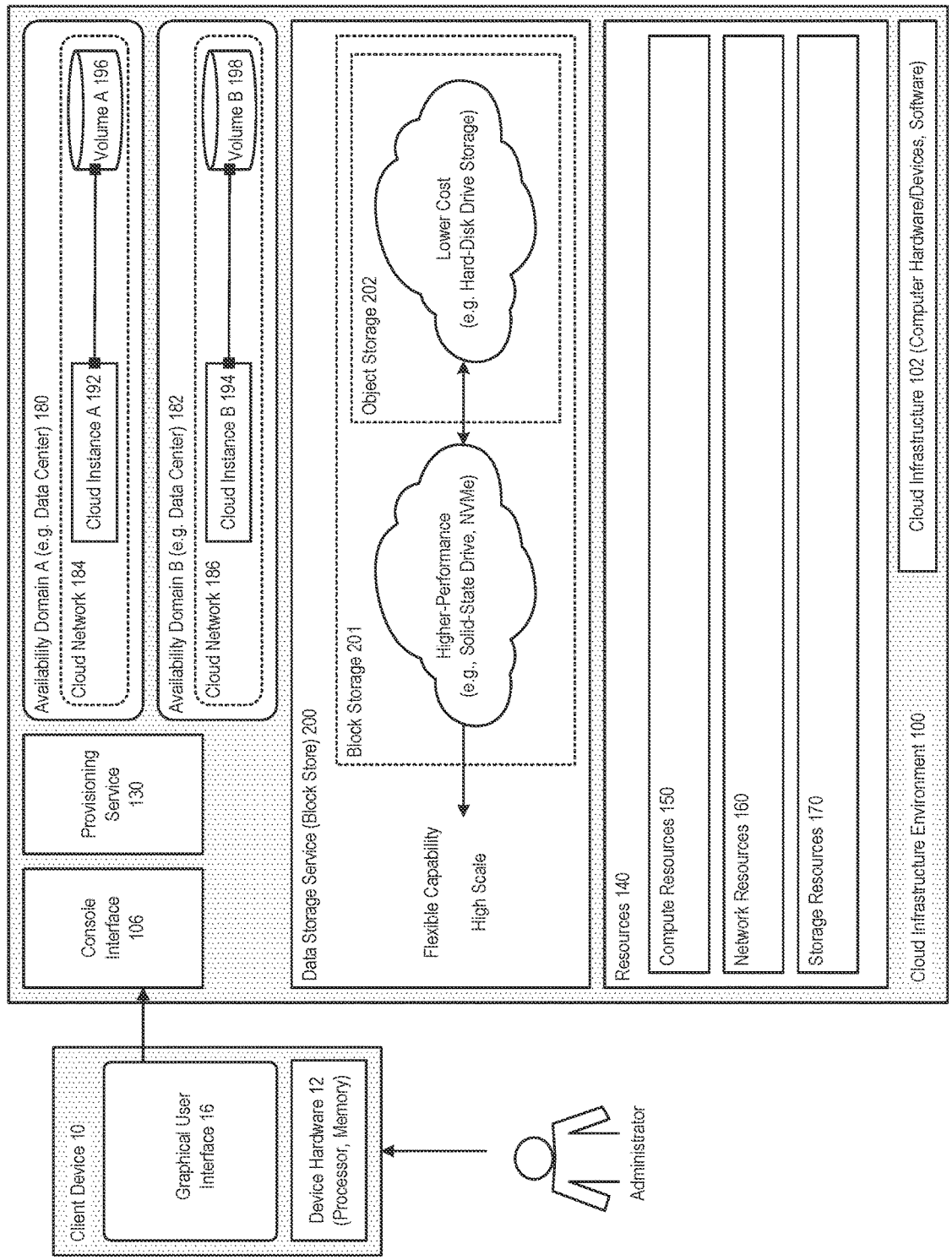
FIG. 3 further illustrates an example cloud infrastructure environment, including the use of a data storage service and tiered data storage, in accordance with an embodiment.

FIG. 3 further illustrates an example cloud infrastructure environment, including the use of a data storage service and tiered data storage, in accordance with an embodiment.

As illustrated in FIG. 3, in accordance with an embodiment, the data storage service (block store) is adapted to automatically adjust the storage of data for a data/block volume that can be associated with a cloud instance, across performance tiers, for example by allocating storage of data between a first type of data storage (for example, block storage 201), associated with a first performance characteristics or performance tier, for example solid-state drive (SSD) storage; and a second type of data storage (for example, object storage 202), associated with a second performance characteristics or performance tier, for example hard disk drive (HDD) storage.

For example, the cloud infrastructure environment can include object storage which is provided as an Internet-accessible, high-performance storage platform that can store large (unlimited) amounts of unstructured data of any content type, including analytic data and rich content such as images and videos. Such object storage enables a cloud customer/user to store or retrieve data directly from the Internet or from within the cloud platform. Elasticity allows the customer/user to start small and scale seamlessly, without experiencing any degradation in performance or service reliability.

In accordance with an embodiment, the cloud infrastructure environment can include a service that allows for dynamically provisioning and managing data/block volumes. For example, a user can create, attach, connect, and move data/block volumes as needed to meet their storage and application requirements.

Generally described, a data/block volume requires a cloud instance, for example a bare metal or virtual machine (VM) host running in the cloud; and a volume attachment. After attaching and connecting a data/block volume to a cloud instance, the data/block volume can be used like a regular hard drive. A data/block volume can be detached and attached to another cloud instance without the loss of data.

In accordance with an embodiment, data/block volume scenarios can include adding storage capacity to an OCI cloud instance. For example, after launch a cloud instance and setting up a cloud network, a user can create a data/block volume through the console or API; and attach the data/block volume to a cloud instance using a volume attachment. The data/block volume can then be mounted and used by an associated cloud instance. Data/block volumes offer a high level of data durability compared to standard, attached drives. All data/block volumes are automatically replicated, helping to protect against data loss.

Object storage is provided as a regional service and is not tied to any specific compute cloud instance. This allows a customer/user to access their data from anywhere inside or outside the context of an OCI environment, as long they have Internet connectivity and can access one of the object storage endpoints.

In accordance with an embodiment, the system can adjust the storage of data for a data/block volume that can be associated with a cloud instance, for example by changing the ratio of SSD to HDD storage per data/block volume, in response to which the system can efficiently move block storage data to and from object storage.

For example, in accordance with an embodiment, a "lower cost" tier, suitable for workloads that are cost-sensitive or throughput-intensive with large sequential I/O, such as big data, log processing, and data warehouses, may include 2 IOPS/GB up to 3,000; a throughput of 240 KBPS/GB up to 480 MBPS; and no performance SLAs. A "balanced" tier offers a balanced choice for most workloads including those that perform random I/O such as boot disks, may include 60 IOPS/GB up to 25,000; a throughput of 480 KBPS/GB up to 480 MBPS; and performance SLAs. A "higher performance" tier, perhaps recommended for the most 10-demanding workloads that require the best possible performance including large databases, may include 75 IOPS/GB up to 35,000; a throughput of 600 KBPS/GB up to 480 MBPS; and performance SLAs.

The above examples are provided by way of example to illustrate various types of tiers. In accordance with other embodiments, other examples and types of tiers can be supported, with other characteristics. The system is flexible such that it can easily add more tiers in the future in response to market demand.

Additionally, in accordance with an embodiment, since tiered data storage supports dynamically configuring the performance of a data/block volume while it is actively in use, the system can "auto-tune" the performance of their data/block volumes. When customers enable automatic tuning, the system will intelligently monitor the performance and load characteristics of the data/block volume, and in response adjust the performance up or down. Automatic tuning ensures that customer workloads always get the performance they need, while maximizing savings on storage costs.

Data Storage Service (Block Store)

In accordance with an embodiment, the system includes a data storage service (block store) adapted to automatically adjust the manner or ratio by which the data for a data/block volume, which is associated with a cloud instance, can be stored to meet the requirements of a volume performance tier. For example, storage of the data/block volume can be allocated between a first type of data storage associated with a first performance characteristics or performance tier; and a second type of data storage associated with a second performance characteristics or performance tier.

For example, in accordance with an embodiment, the data storage service (block store) can automatically adjust the storage of data for a data/block volume, which is associated with a cloud instance across performance tiers, by allocating storage of data between a first type of data storage and performance tier, such as solid-state drive (SSD), non-volatile memory express (NVMe), or block storage; and a second type of data storage and performance tier, such as hard disk drive (HDD), or object storage.

In accordance with an embodiment, a data storage service (block store) can store the data associated with a particular data/block volume as multiple replicas, to one or more data storage devices. Data writes can be sent to all of the replicas provided at the data storage device. Data reads can be processed by any one of those replicas at the data storage device. In such an environment, a data storage device such as an SSD/NVMe device may provide higher performance. However, the need for higher performance storage is generally more pertinent when an associated cloud instance needs immediate access to the data in the data/block volume; and is generally less pertinent when the associated cloud instance does not need such immediate access to the data, for example when the data/block volume is detached from the cloud instance. In such a scenario, the use of an SSD/NVMe device to store all of the replicas associated with the data/block volume would typically result in a higher cost, both to the cloud provider and the customer, and ultimately may not provide much difference in overall data performance.

In accordance with an embodiment, to address scenarios such as the above, the system enables a portion or all of the data storage associated with a particular data/block volume, which for example might have been stored/cached as replicas in an SSD/NVMe device, to be instead stored in a different storage device, for example an HDD device, which may have lesser performance characteristics but is more cost-effective, both for the cloud provider and customer. For example, in a cloud infrastructure environment that utilizes a combination of block storage and object storage, the system enables some of the data storage associated with a particular data/block volume to be adjusted from being stored in block storage, to being store instead in object storage.

Figure 4:
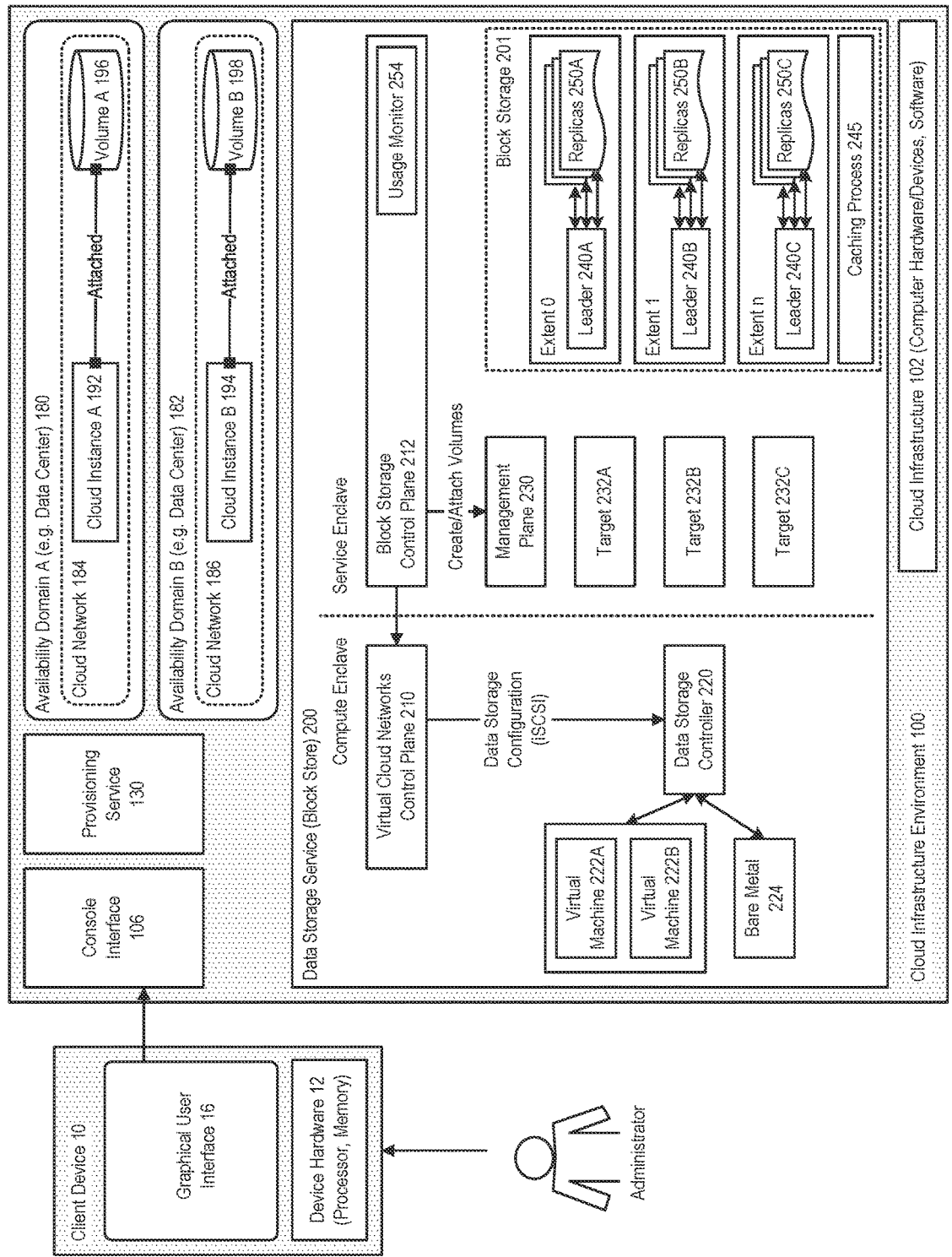
FIG. 4 further illustrates a data storage service for use in a cloud infrastructure environment, in accordance with an embodiment.

FIG. 4 further illustrates a data storage service for use in a cloud infrastructure environment, in accordance with an embodiment.

As illustrated in FIG. 4, in accordance with an embodiment, the data storage service (block store) operates across computer/service enclaves, to provide communication between a virtual cloud networks control plane 210 and a block storage control plane 212. The virtual cloud networks control plan operates with a data storage controller 220, for example a Cavium network storage controller card, which is adapted to provide data access to virtual machines 222S, 222B or bare metal processes 224.

In accordance with an embodiment, the block storage control plane operates with a management plane 230 to attach/detach data/block volumes to cloud instances. As further described below, a data/block volume 201 can be associated with targets 232A, 232B, 232C, wherein data/block volumes are sharded into extents, each of which is a unit of management and replication, and each of which extents can include a leader 240A, 240B, 240C that provide access to data stored in replicas 250A, 250B, 250C and under control of a caching process 245. The mapping of data/block volume to extents is stored in a metadata server. An extent is composed of multiple servers, and data for the extent is replicated amongst those servers.

Figure 5:
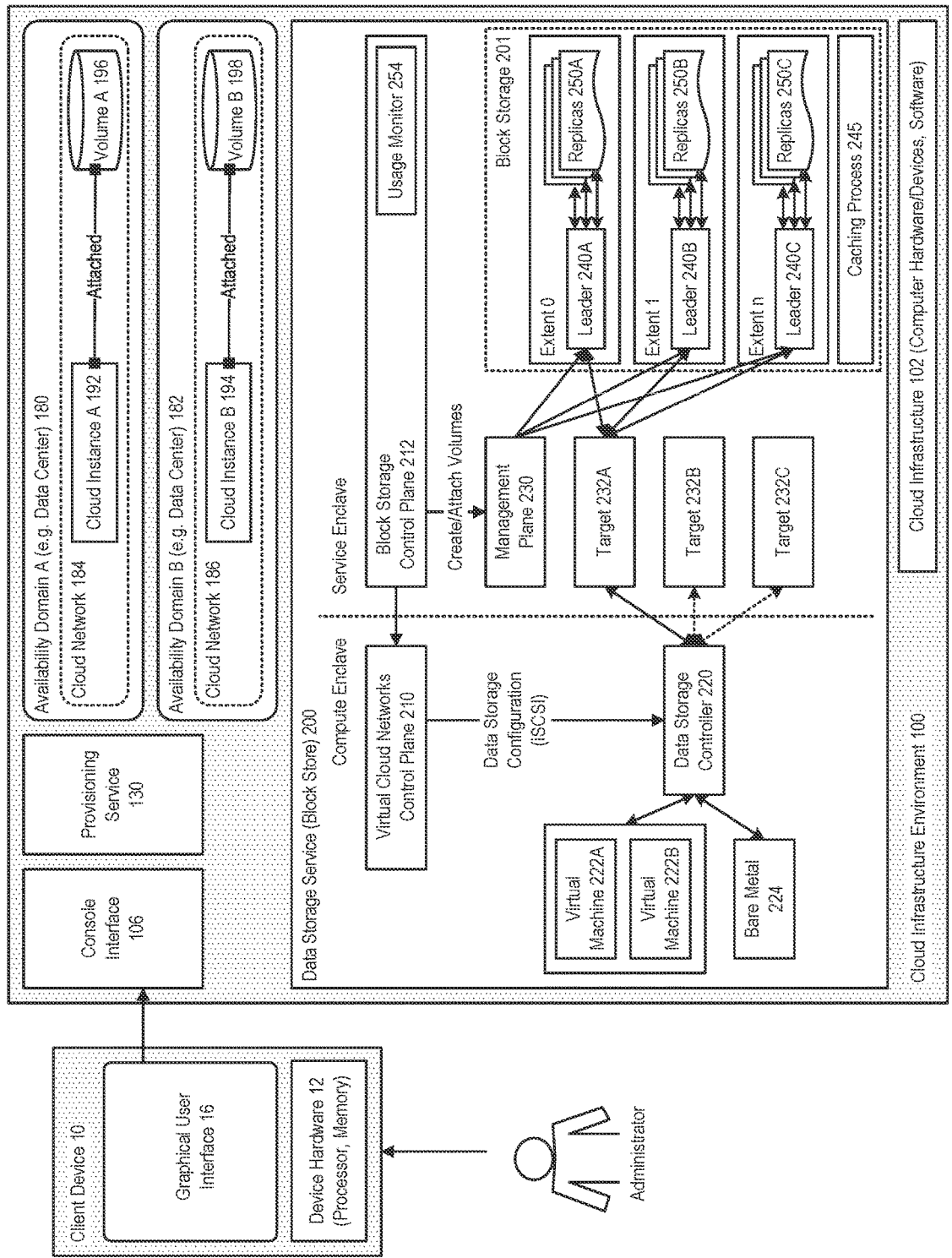
FIG. 5 further illustrates a data storage service for use in a cloud infrastructure environment, in accordance with an embodiment.

FIG. 5 further illustrates a data storage service for use in a cloud infrastructure environment, in accordance with an embodiment.

As illustrated in FIG. 5, in accordance with an embodiment, a leader is elected for each extent, and replication for writes is driven by the leader. A client sends all read/write I/O requests to the current leader. As data is accessed a usage monitor 254 can track performance information. Data can replicated, for example using a multi-degree Paxos or other type of replication algorithm.

Extents

In accordance with an embodiment, data/block volumes are sharded into fixed-sized extents, with the mapping of a data/block volume to extents is stored in a metadata server. A smaller extent size allows better control over load distribution and resizing data/block volumes, at the expense of larger metadata size. An extent can contain a contiguous range of the data/block volume. For example, a 100 GB data/block volume can be composed of 10 extents, wherein the first extent contains range 0 to 10 GB, a second extent has 10 GB—20 GB, and so on. The system can round-robin distributed a set of pages across an extent, to allow higher throughput by doing parallel I/O across multiple extents, i.e., a stripe set.

Replication

In accordance with an embodiment, an extent is composed of multiple servers and data for the extent is replicated amongst those servers. A leader is elected for each extent and replication for writes is driven by the leader. The client sends all read/write I/O requests to the current leader. Here client refers to code on the storage controller, e.g., a Cavium controller card associated with the customer cloud instance that has attached the data/block volume. For each write, the leader sends the data to all replicas in the group, but only waits for a majority for acknowledgement. The write should be considered successful as soon as the majority replies.

In accordance with an embodiment, data is replicated using a multi-decree Paxos algorithm, with the following changes: out of order writes are not accepted; a server sends back acknowledgements in order, and will not accept a write if it has not seen the previous write, except for the case where it doesn't have any data.

In accordance with an embodiment, replicas in an extent elect a leader themselves. The leader periodically sends heartbeat messages to all the replicas. A replica starts a new election if it doesn't hear from a leader within a given timeout by incrementing the view number and sending a prepare message. A leader can have multiple outstanding requests that have been accepted by one or more replicas. The prepare message prevents the replica from accepting any message from the previous leader.

Reading

In accordance with an embodiment, acknowledgements from the server come in the same order as messages. For each replica, the leader keeps track of: a sequence number of last accepted message from the replica; and whether the replica is part of the read set. The leader also keeps track of uncommitted writes for retries in case of connection failures. Additionally, leader can cache the last N committed writes and their sequence number. This cache allows the leader to load balance reads to replicas with slightly older data.

If the requested block is in the cache, any server with a sequence number greater than or equal to the block sequence number can be read from. This includes servers that are not part of the read set.

If the block is not in the cache, then any server with sequence number higher than cache sequence number can be read from. However, servers that are not in the read set need to be excluded since we don't know when the block was last written and could be missing from the server.

Re-Replication

In accordance with an embodiment, a re-replication process operates so that a replica learns the missing data. Re-replication occurs when replicas fall behind because of transient failures or getting disconnected from the client for any reason. On reconnection, they need to learn the missing messages. A new replica needs to learn the existing data.

Replica Set Change

In accordance with an embodiment, to address failed replicas, the replicas in the set periodically send ping messages. The status of the ping messages is reported to a controller. If the client is attached to the data/block volume, the client can also send status about each replica to the controller. Reconfiguration can be performed using a vertical Paxos algorithm.

Snapshots

In accordance with an embodiment, snapshots are point in time consistent. This means that if a write A is followed by a write B, then the snapshot has write B it must also contain write A. However, there are no consistent for writes outstanding at the time the snapshot is taken. Any or none of those writes might be part of the snapshot. Creating the snapshot and uploading the manifest and the blocks is orchestrated by a snapshot manager. A single data/block volume has multiple extents and all the extents have to be point in time consistent.

Allocation Policy

The placement of the replicas within an extent and the placement of extents for a given data/block volume affect availability and durability. As such, the allocation policy has a number of constraints when allocating new replicas and extents, to limit the effect of a drive or a server failing. The choice of number of groups per drive represents a tradeoff between load balancing and reliability. For example, when a drive is repaired or new nodes are added to the system, the system does not actively migrate extents from other drives to the repaired drive. Instead, on subsequent drive/node failures, the system favors drives that have less data as replacements while still maintaining the placement constraints.

Data Caching

In accordance with an embodiment, the system can determine which data storage devices to use, to meet a particular performance requirement, for example using a caching process to determine a cache fraction or otherwise determine which data associated with a particular data/block volume should be considered "hot" from the customer's perspective, for which it may be appropriate to retain or cache that data in a high-performance storage device, for example an SSD/NVMe device or block storage; or which other data associated with a particular data/block volume should be considered "cold" from the customer's perspective, for which it may be appropriate to move that data to a lower-performance storage device, for example an HDD device or object storage In accordance with an embodiment, the caching process can use a least-recently-used (LRU) or other caching policy to determine which data/block volumes, or portions of data stored therein, are considered "hot" or "cold". In such an environment, the data associated with a particular data/block volume can be written as usual, for example to an SSD/NVMe device or block storage. When the data associated with a particular data/block volume subsequently becomes "cold", it can be evicted from the SSD/NVMe device or block storage, and written HDD device or object storage. Any new writes to those data/block volumes can be uploaded to the appropriate, e.g., object storage as needed.

In accordance with an embodiment, leaders will be responsible for making caching decisions within each extent. An extent leader will need to know which blocks are available on which replicas. It will also need to unmap blocks from some or all replicas based on the caching policy. For example the leader will deterministically cache different blocks on different replicas based on which 32 KB stripe the block is in.

For every (written) block, the system knows which replicas have a copy of the current version of that block. One approach to doing this is to add a small bitmap to the leader's block info (e.g., a LazyDeque-compressed map from block id to sequence number).

When blocks are initially written, they are considered mapped on all three replicas. Once an upload completes and the blocks become eligible for eviction, the leader will check if the blocks have cache entries and then either unmap from two or all three replicas (updating the block info bitmap accordingly). When keeping a block on one replica, it will choose the replica based on a combination of balancing the cache size across the replicas and keeping 32K-aligned segments of blocks cached on the same replica (or some cache line size that is at least the 8 block stripe width).

Cache Data Structure

The leader's cache data structure is used to determine which blocks to keep after an upload completes and which blocks to evict first when caching reads (and potentially new writes) after cache misses. For example, the system can maintain a simple LRU cache: a linked list of cache entries plus an unordered map from block id to cache entries.

Cache Eviction and Unmapping

In accordance with an embodiment, when cache entries are evicted, they can land in three different buckets for unmapping: Blocks with seqNum<lastSuccessfulUploadSeqNum, which can be unmapped immediately. Blocks with seqNum<currentUploadSeqNum, which will move into the first set once the current upload completes. All newer blocks will move into the second set once a new upload is started.

Tracking Mapped/Unmapped Block Status

In accordance with an embodiment, to support retaining cached blocks after leader failover, the new leader needs to know what blocks are mapped/unmapped on each replica. During normal operation, a block is assumed to be mapped on all replicas if it has a seqNum>lastSuccessfulUploadSeqNum, otherwise it is assumed to be unmapped on non-preferred replicas.

Populating Cache After Leader Failover

In accordance with an embodiment, a GetUnmappedBlocks API is used to get the unmapped blocks bitset for each replica. Modified blocks that are mapped on the preferred replica are added to the cache in the order received. Once the cache is full, the remaining blocks are queued for eviction.

Tiered Data Caching

In accordance with an embodiment, tiered data storage can utilize tiered data/block volumes (low-cost data/block volumes), which cache a configurable amount of blocks in local SSD/NVMe drives and offload all other blocks in the data/block volume to object storage. The data/block volumes can be partitioned into extents and each extent will have three replicas, replicated via Paxos just like regular data/block volumes. These data/block volumes will therefore have the same (if not slightly better) durability and availability characteristics as current data/block volumes.

In accordance with an embodiment, writes will be sent to all three replicas—the writes will be written to a file and then truncated to the checkpoint file after they have been committed. An asynchronous process will first package up all the recent writes into, e.g., 4 MB chunks (similar to the chunks in backups) and upload them to object storage. Once a chunk has been uploaded successfully, these blocks can be evicted from local storage (accomplished by unmapping the corresponding file offsets in the checkpoint file). Reads will fault-in the blocks missing in the cache by fetching from object storage. Low-cost data/block volumes will have feature parity with regular data/block volumes, to support features such as, e.g., fast-clones, and backup-and-restore.

Background Object Storage Uploads

As more writes happen, the leader will take an incremental snapshot and use this as the basis for the next upload to object storage. Once the upload to object storage is complete, the leader is free to unmap those blocks from the three replicas.

CheckpointMetadata Index

Acceptors do not make caching decisions. An acceptor is told by the leader to evict a block from the cache by unmapping the file-offset in the checkpoint file. The acceptor will remember which blocks have been unmapped in the CheckpointMetadata index file. Similarly when blocks are re-populated into the cache, index needs to be updated. When a new leader is elected, as part of populating the block-info cache the new leader will ask each acceptor the seqNum for each block and the cacheStatus of each block (Boolean value).

UploadReq

The leader will ask an acceptor to package up the blocks into a chunk and upload the chunk to Object storage. The blocks will be read from a snapshot file created by the leader for this iteration.

UnmapReq

The leader specifically instructs the replica to unmap a set of blocks from a given target file (HEAD, or snapshot file). The target file is identified by the snapshot seqNum. A lastSuccessfulUploadSeqNum is the last upload prior to this snapshot. In the case of HEAD, it is simply the last successful upload.

ReadReq

As part of a read request (ReadReq), the leader could optionally send caching instructions over to an acceptor. Leader includes the blockToChunkMap to tell the acceptor where to find the blocks in Object storage if the blocks are not found in its local cache. It also informs the acceptor if it should store blocks in its local cache after reading from Object storage, and if it should do a read-ahead in the background.

Syncing

Syncing behavior on acceptors operates to skip syncing seqNums<=lastSuccessfulUploadSeq. Even though we can skip syncing these blocks to checkpoint we still need to update the blockId=>seqNum mapping in CheckpointMetadata index. The index needs to be kept updated even if the blocks are not cached locally in the checkpoint file in order to answer GetBlockIdsReq queries during leader election. SyncResp can be modified to include metadata for all blocks but skip sending the block's contents in bulkData section if its seqNum<=lastSuccessfulUploadSeq.

Prepare Phase

While populating the BlockInfo cache during prepare, the leader needs to fetch the cacheStatus of each block on each replica for each active snapshot including HEAD. This will let the new leader rebuild its view of the SSD/NVMe cache for this extent.

Reads

The leader needs to route reads for blocks to the right replica that has the block cached locally. It also needs to decide if it wants to ask an acceptor to write the block to the cache after the read is complete. While doing snapshot reads, leader needs to use the corresponding object storage upload manifest to let the acceptor know where to fault-in the blocks.

Cache Evictions

A background process in leader needs to decide which blocks to evict from which replica and when. This is independent of the background process responsible for creating new uploads.

Tiered Data Storage User Interface

In accordance with an embodiment, the system can provide to customers the opportunity to trade off cost of data storage versus performance; while at the back-end, the storage of the data can be distributed across different storage mechanisms, to meet the cost and performance expectations of the customer. For example, in accordance with an embodiment, a graphical user interface enables configuring data/block volumes to use particular performance tiers, and/or to support automatic tuning; and the system can accommodate such preferences.

Figure 6:
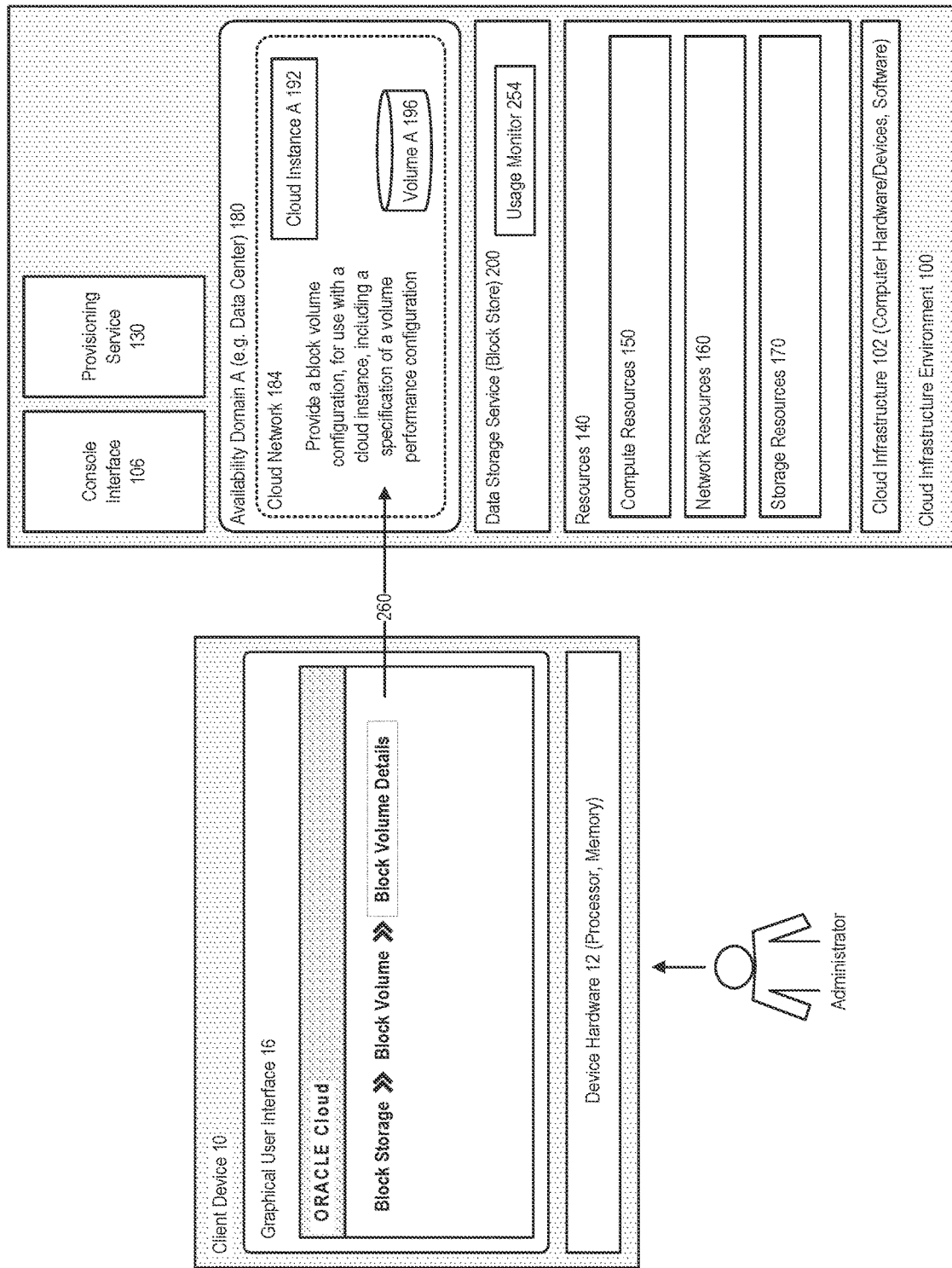
FIG. 6 illustrates data/block volume configuration, including use of a data/block volume with a cloud instance, in accordance with an embodiment.

FIG. 6 illustrates data/block volume configuration, including use of a data/block volume with a cloud instance, in accordance with an embodiment.

As illustrated in FIG. 6, in accordance with an embodiment, the client can display a graphical user interface that allows configuration of data/block volume details, in particular to provide 260 a data/block volume configuration, associated with a cloud instance, including a specification of a data/block volume performance configuration.

Figure 7:
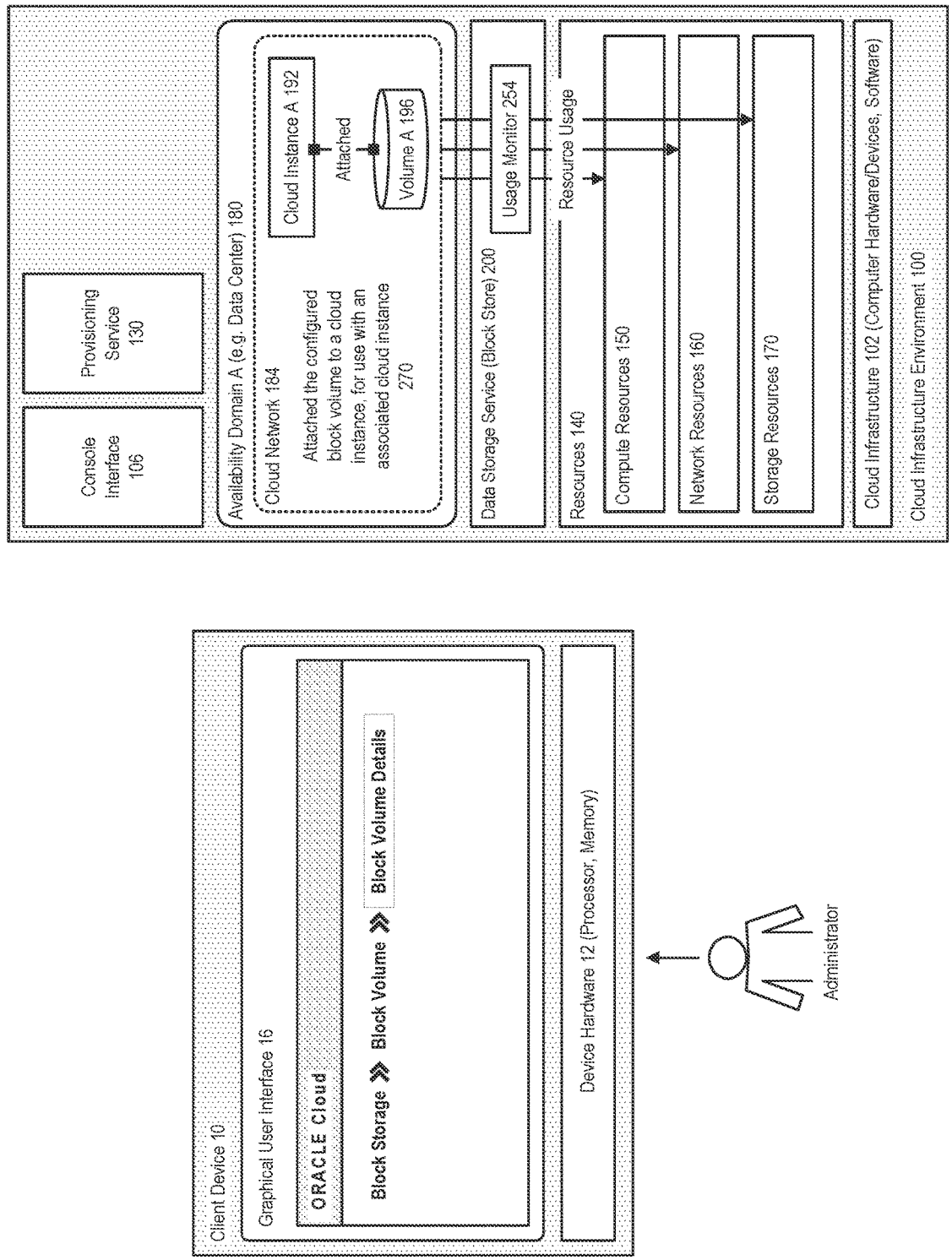
FIG. 7 further illustrates data/block volume configuration and use with a cloud instance, in accordance with an embodiment.

FIG. 7 further illustrates data/block volume configuration and use with a cloud instance, in accordance with an embodiment.

As illustrated in FIG. 7, in accordance with an embodiment, at a point in time, the configured data/block volume can be attached to a cloud instance, for use with an associated cloud instance 270.

Figure 8:
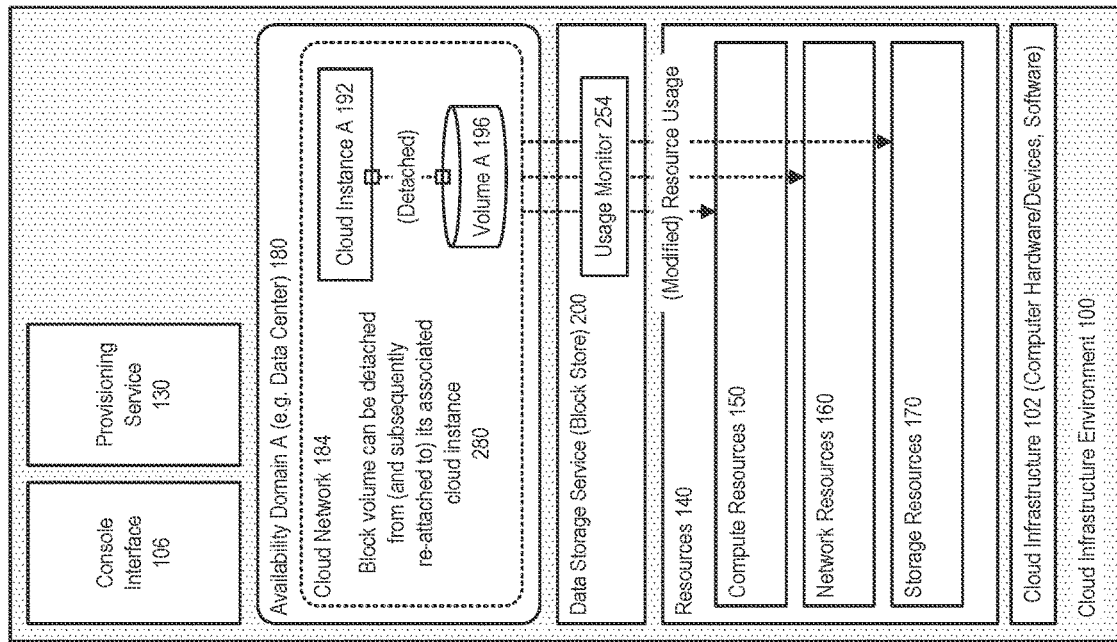
FIG. 8 further illustrates data/block volume configuration and use with a cloud instance, in accordance with an embodiment.
Figure 8:
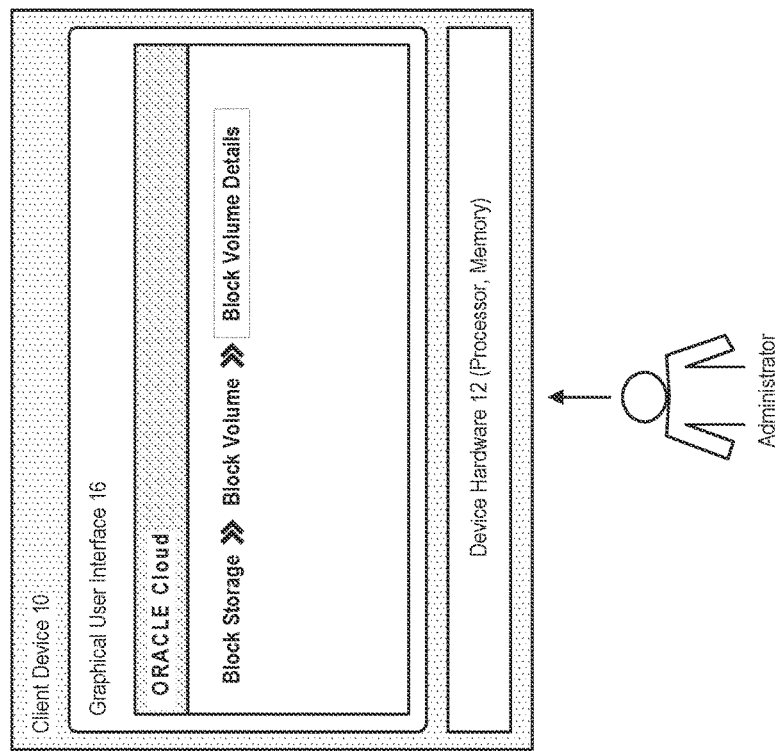

FIG. 8 further illustrates data/block volume configuration and use with a cloud instance, in accordance with an embodiment.

As illustrated in FIG. 8, in accordance with an embodiment, the data/block volume can be detached from (and subsequently re-attached to) its associated cloud instance 280.

In accordance with an embodiment, the approach can be used to provide a simple model which provides customers with a single block storage offering, with performance that can be dynamically changed to meet the demands of their workload.

For example, in this model, customers can pay independently for storage (low fixed cost equivalent to HDD) and performance; including the purchase of Data/block volume Performance Units (VPUs) which customers add to a data/block volume to increase its performance; including allocating more resources to the data/block volume and increases IOPS/GB, throughput/GB, and maximum IOPS for the data/block volume.

Figure 9:
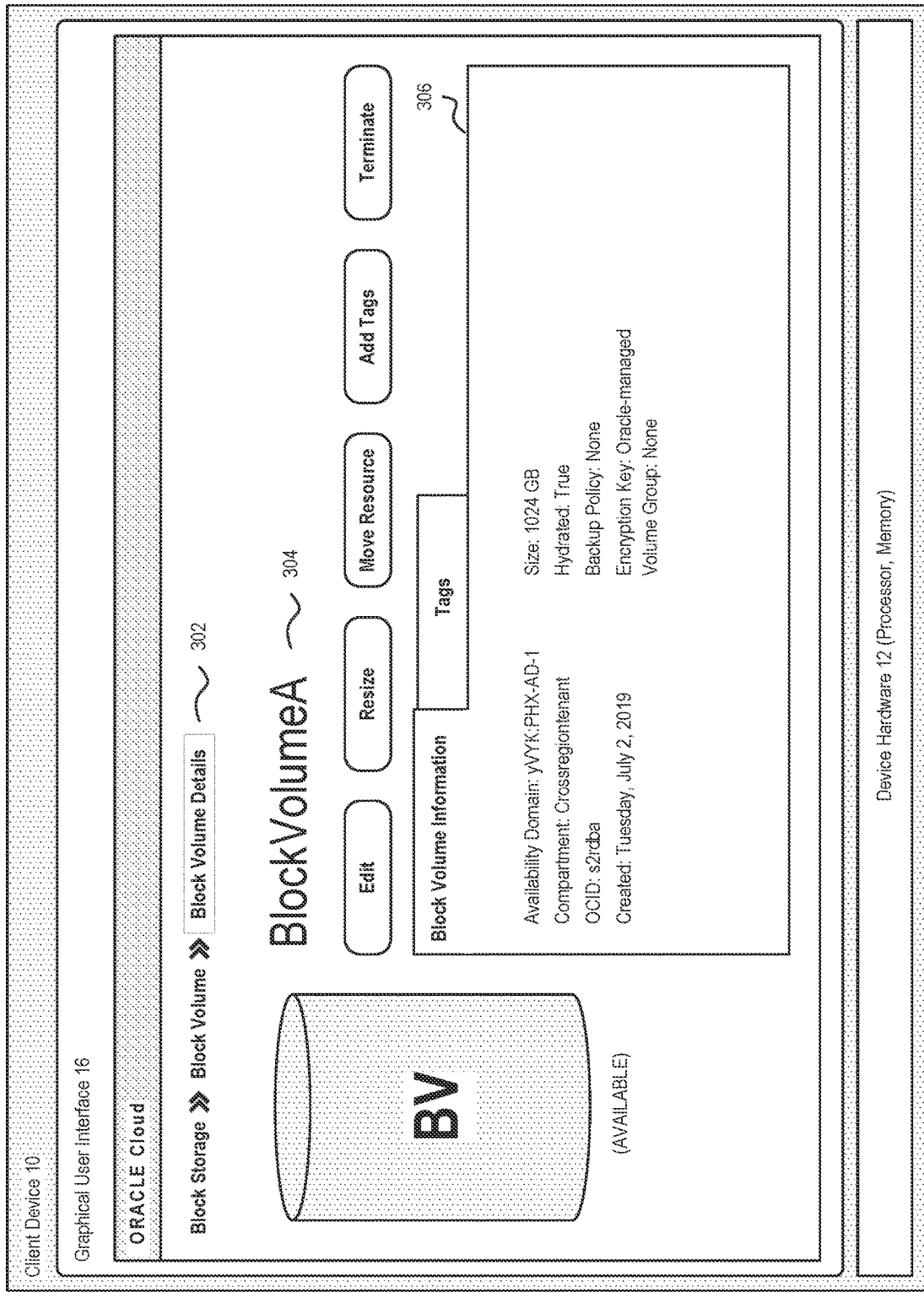
FIG. 9 illustrates an example user interface, for configuring tiered data storage with a data/block volume, in accordance with an embodiment.

FIG. 9 illustrates an example user interface, for configuring tiered data storage with a data/block volume, in accordance with an embodiment.

As illustrated in FIG. 9, in accordance with an embodiment, the configuration of data/block volume details 302, for a particular, e.g., named data/block volume (BlockVolumeA) 304, can include a plurality of data/block volume information 306 indicative of, for example, availability domain, size, backup policy, or other data/block volume-specific configuration information.

Figure 10:
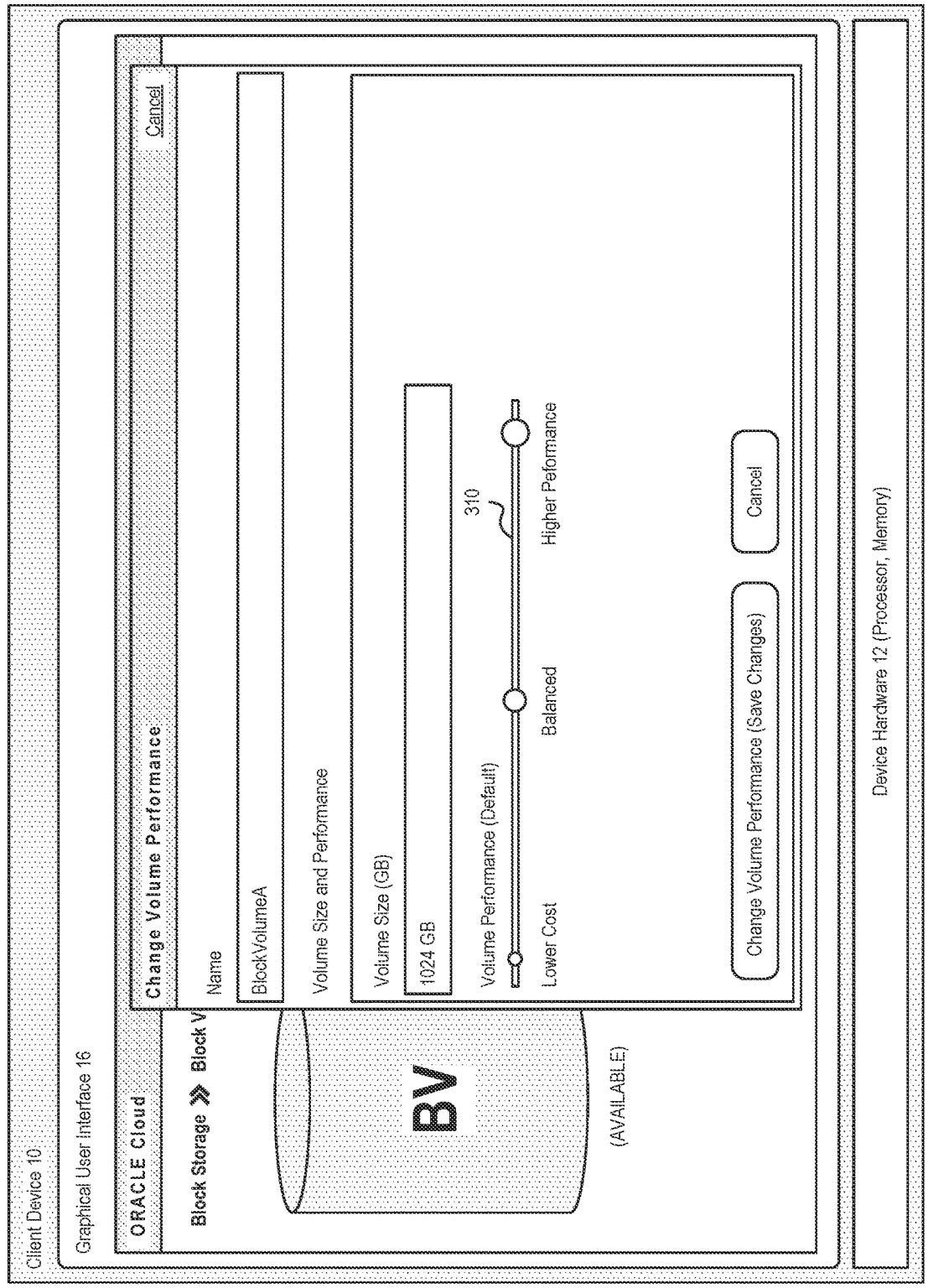
FIG. 10 further illustrates an example user interface, in accordance with an embodiment.

FIG. 10 further illustrates an example user interface, in accordance with an embodiment.

As illustrated in FIG. 10, in accordance with an embodiment, the user interface for data/block volume configuration can include an interactive user interface device 310, for example a slider bar that allows selection of a particular data/block volume performance to be associated with the data/block volume in this example a plurality of performance options ranging from lower cost, to balanced, or higher performance.

Figure 11:
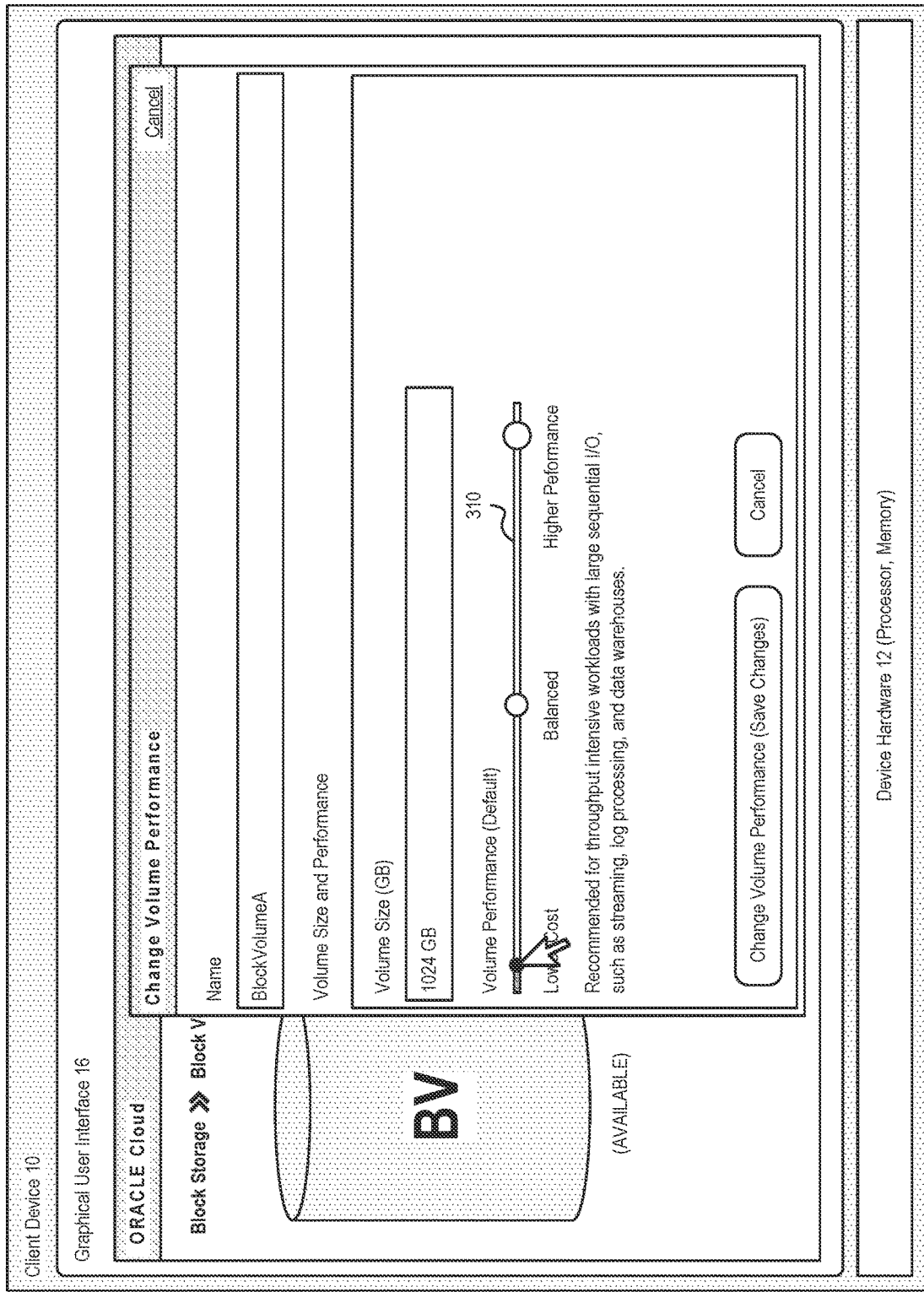
FIG. 11 further illustrates an example user interface, in accordance with an embodiment.

FIG. 11 further illustrates an example user interface, in accordance with an embodiment.

As illustrated in FIG. 11, in accordance with an embodiment, lower cost is recommended for throughput intensive workloads with large sequential I/O, such as streaming, log processing, and data warehouses.

Figure 12:
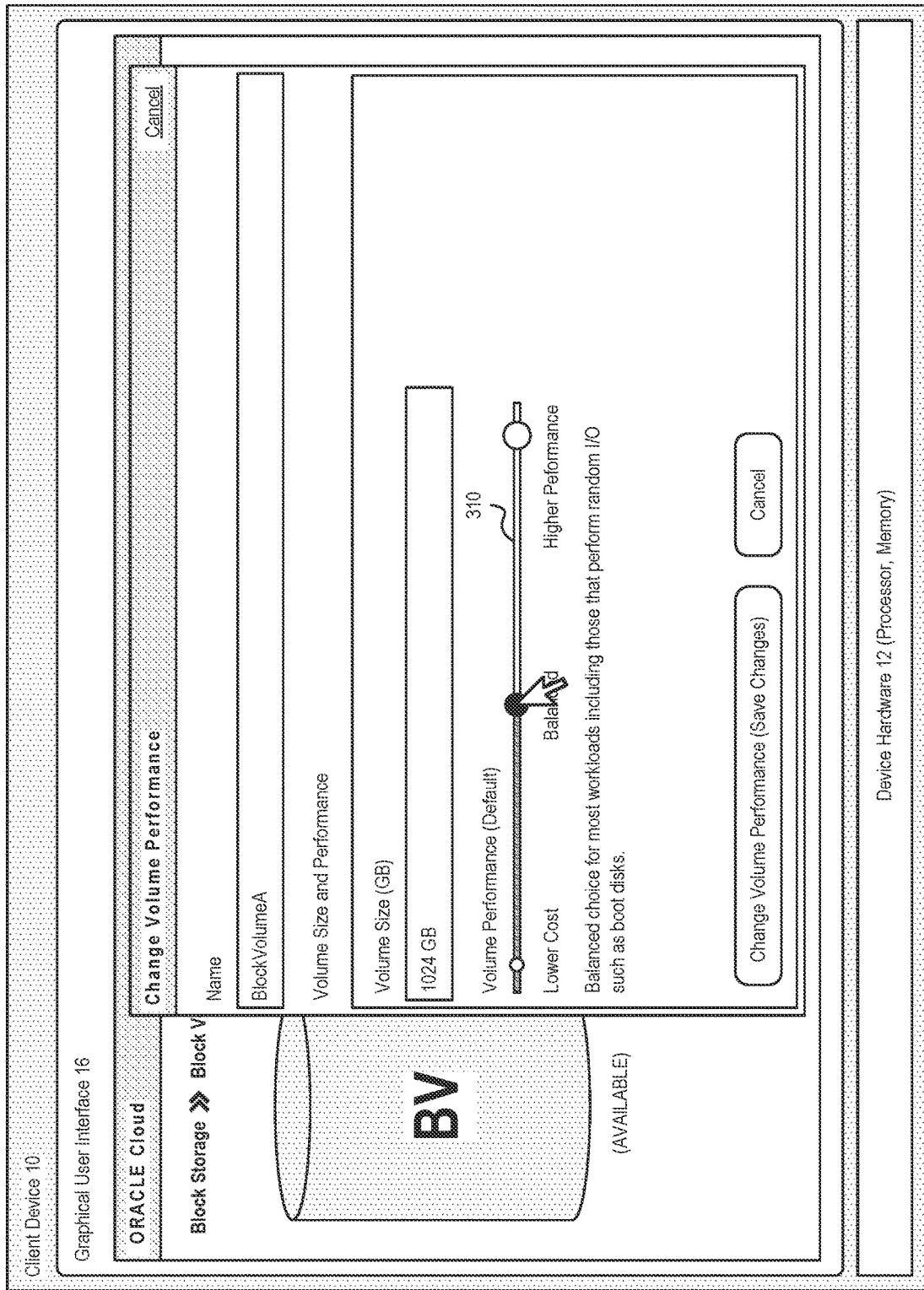
FIG. 12 further illustrates an example user interface, in accordance with an embodiment.

FIG. 12 further illustrates an example user interface, in accordance with an embodiment.

As illustrated in FIG. 12, in accordance with an embodiment, a balanced choice for most workloads including those that perform random I/O such as boot disks.

Figure 13:
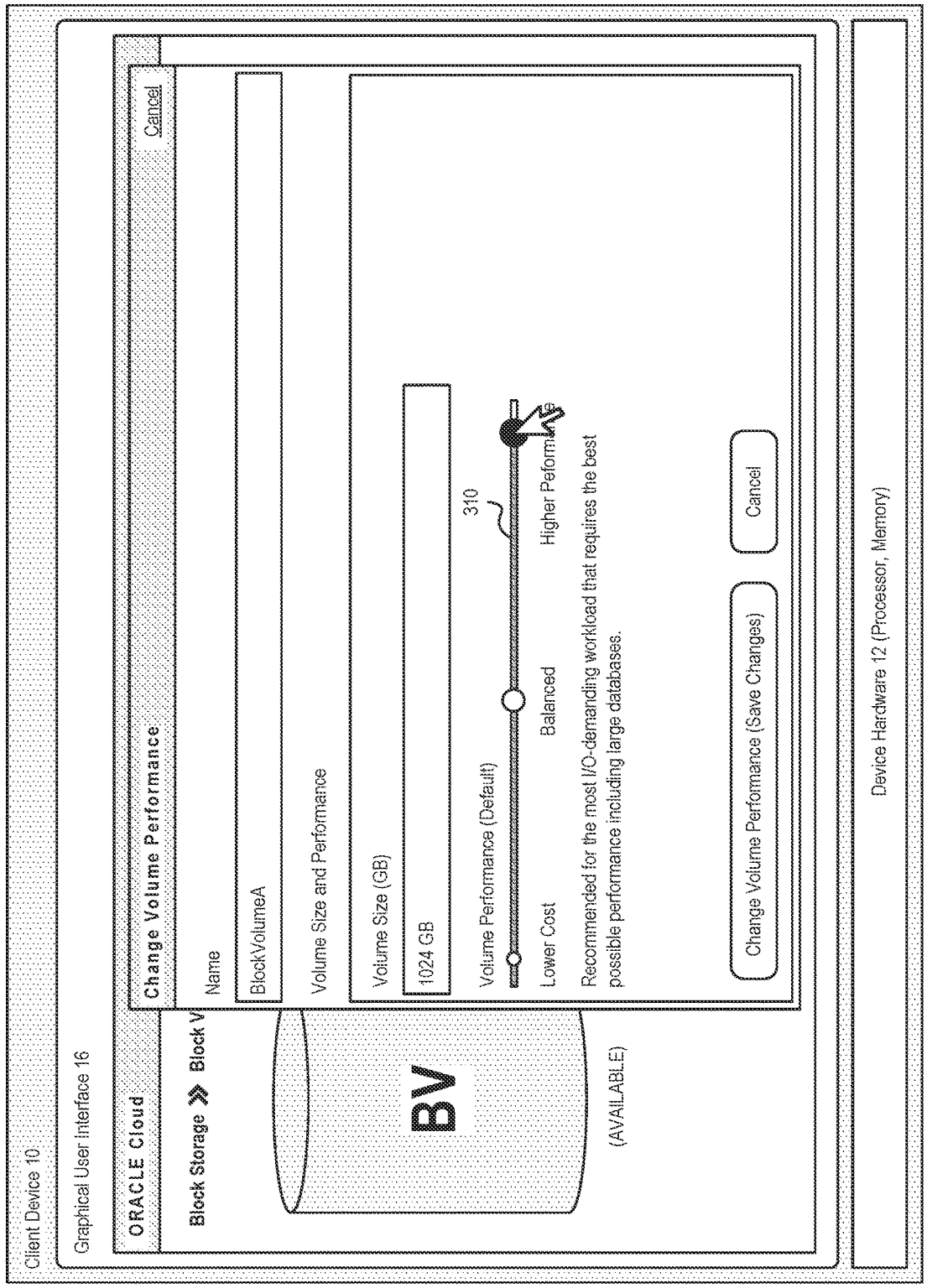
FIG. 13 further illustrates an example user interface, in accordance with an embodiment.

FIG. 13 further illustrates an example user interface, in accordance with an embodiment.

As illustrated in FIG. 13, in accordance with an embodiment, higher performance is recommended for the most I/O-demanding workload that requires the best possible performance including large databases.

Automatic Data/Block Volume Tier Tuning for Detached Volumes

In some cloud infrastructure environments, there may be thousands of data/block volumes that are not attached at all times to associated cloud instances. In accordance with an embodiment, the system can accommodate the particular example of when a particular data/block volumes should be considered "cold" due to the data/block volume being detached from an associated cloud instance.

For example, in accordance with an embodiment, when a data/block volume is attached to one or more cloud instances, the data/block volume's performance can be the default performance setting; when the data/block volume is detached, the data storage service can adjust the performance setting to lower cost, for both data/block volumes and boot data/block volumes; when the data/block volume is reattached, the performance can be adjusted back to the default performance setting.

For example, if the cloud instance is not attached to the data/block volume, then the entire data/block volume can be considered "cold" and evicted as appropriate. Such a determination can be used to support, for example, a lower performance tier for detached data/block volumes options. In other scenarios, some or all of the data/block volumes, or portions of data stored therein may be considered "hot" or "cold", and an assessment can be made on a data-usage basis.

For example, in accordance with an embodiment, the system can control or indicate the use of a lower tier for a detached data/block volume. When a data/block volume is detached and idle for certain period of time, the data storage service (block store) will reclaim the resources associated with the idle data/block volume. The tuned data/block volume will be 100% cache fraction (i.e., how much kept in SSD/NVMe versus object storage where 100% means keeping one replica in SSD/NVMe storage rather than three replicas—which provides the durability of object storage but the performance of SSD/NVMe) or other mode as appropriate.

Figure 14:
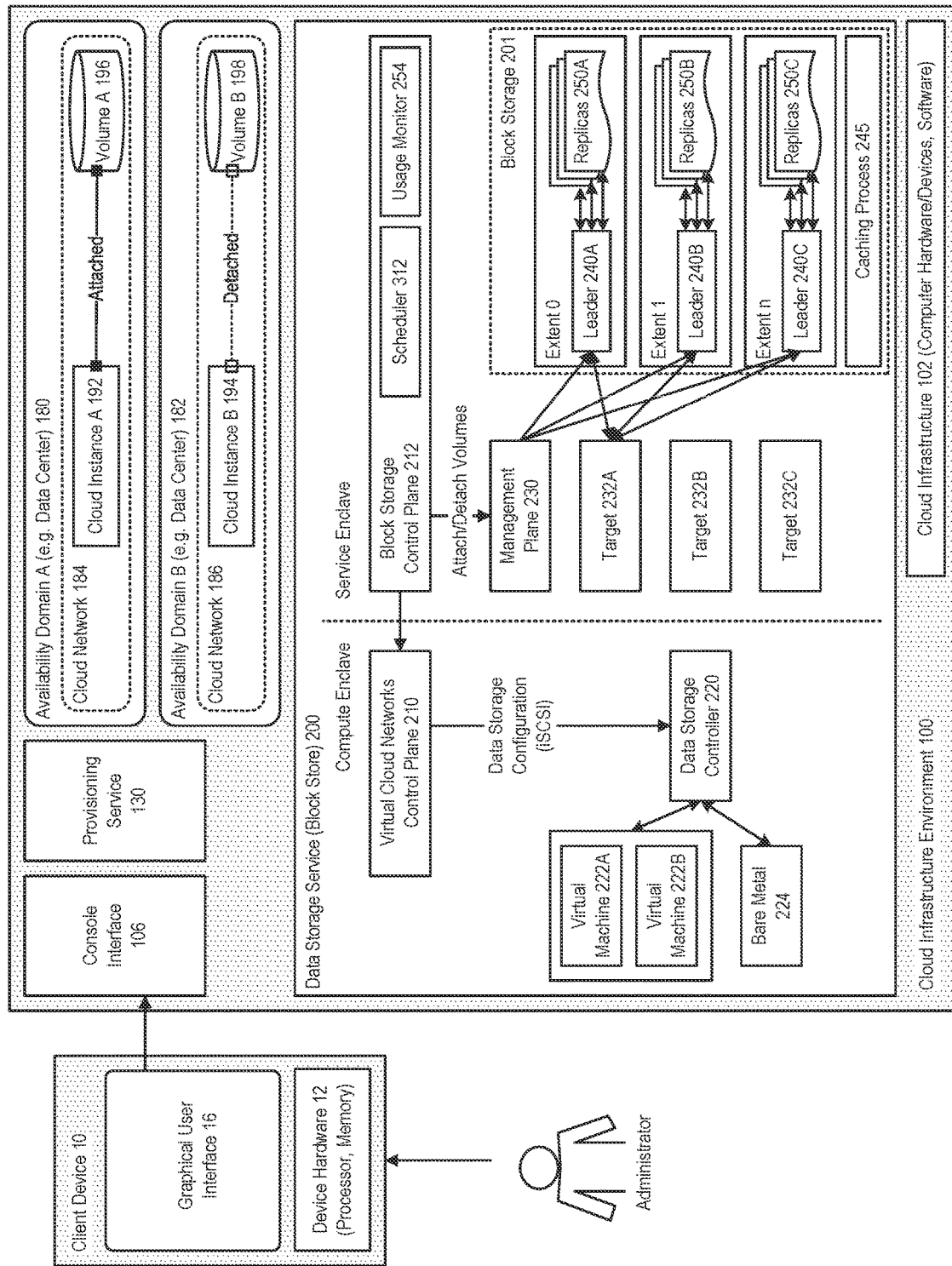
FIG. 14 illustrates a data storage service for use in a cloud infrastructure environment, including support for automatic tuning of performance tiers for detached volumes, in accordance with an embodiment.

FIG. 14 illustrates a data storage service for use in a cloud infrastructure environment, including support for automatic tuning of performance tiers for detached volumes, in accordance with an embodiment.

As illustrated in FIG. 14, in accordance with an embodiment, the system can include a scheduler 312 that controls monitoring is enabled on a data/block volume by the customer. When a data/block volume is selected to auto-tune, the data storage service (block store) control plane will track the data/block volume for idle time and drive the conversion.

For example in accordance with an embodiment, when auto-tune is enabled for a data/block volume, the control plane will start an idle timer; and will reset this timer on attachment and/or backup and/or clone request for the data/block volume. When the idle timer expires, the control plane will drive the conversion process and update the corresponding meter.

In accordance with an embodiment, when a data/block volume is enabled for auto-tune, the data storage service (block store) control plane will start monitoring the data/block volume usage. For example, when the control plane scheduler detects that it is idle for certain period of time (say, 7 days), it will start the auto-tune process at the end of period. control plane will call management plane to start the conversion process and track it until completion. After the conversion is completed, control plane will updates it meters for the data/block volume.

In accordance with an embodiment, when the data/block volume is about to be attached, the control plane will start the attachment and then the restoration process. The control plane will track the restoration process and updates the meter accordingly. Until the restoration is completed, the performance will be that of 100% cache fraction data/block volume. In case of idle data/block volume, its backup/cloning performance will be that of 100% cache fraction data/block volume.

Figure 15:
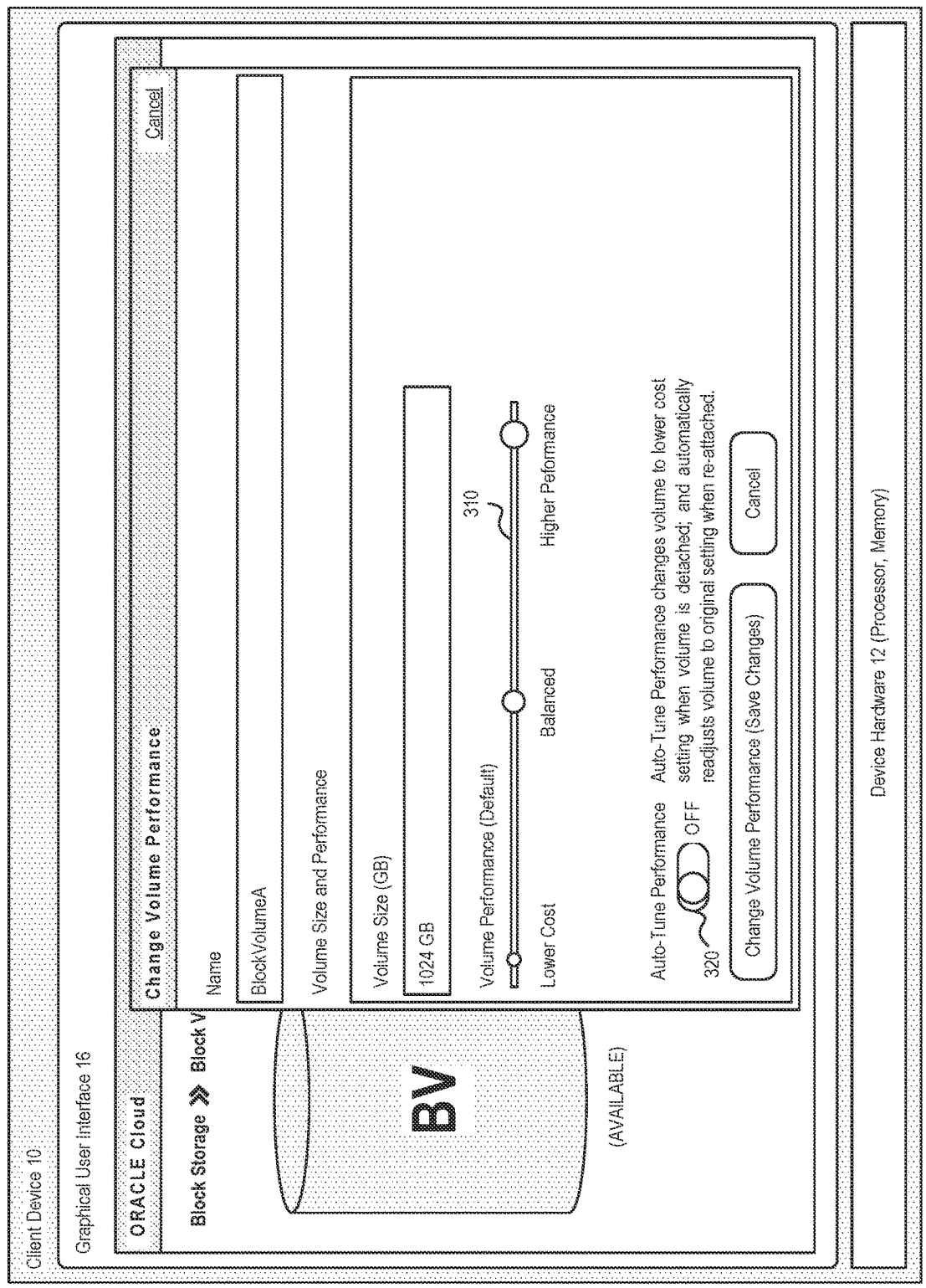
FIG. 15 illustrates an example user interface, for configuring and automatic tuning tiered data storage, in accordance with an embodiment.

FIG. 15 illustrates an example user interface, for configuring and automatic tuning tiered data storage, in accordance with an embodiment.

As illustrated in FIG. 15, in accordance with an embodiment, an interaction device is used to select (or de-select) automatic tuning 320 wherein auto-tune performance changes data/block volume to lower cost setting when data/block volume is detached; and automatically readjusts data/block volume to original setting when re-attached.

When a customer create a data/block volume, the default data/block volume performance setting is specified as "balanced". The customer can change this default performance setting when they create the data/block volume and can also change the default performance setting on an existing data/block volume. When the performance auto-tune feature is disabled, the data/block volume's performance will always be the default performance setting FIG. 16 further illustrates an example user interface, in accordance with an embodiment.

Figure 16:
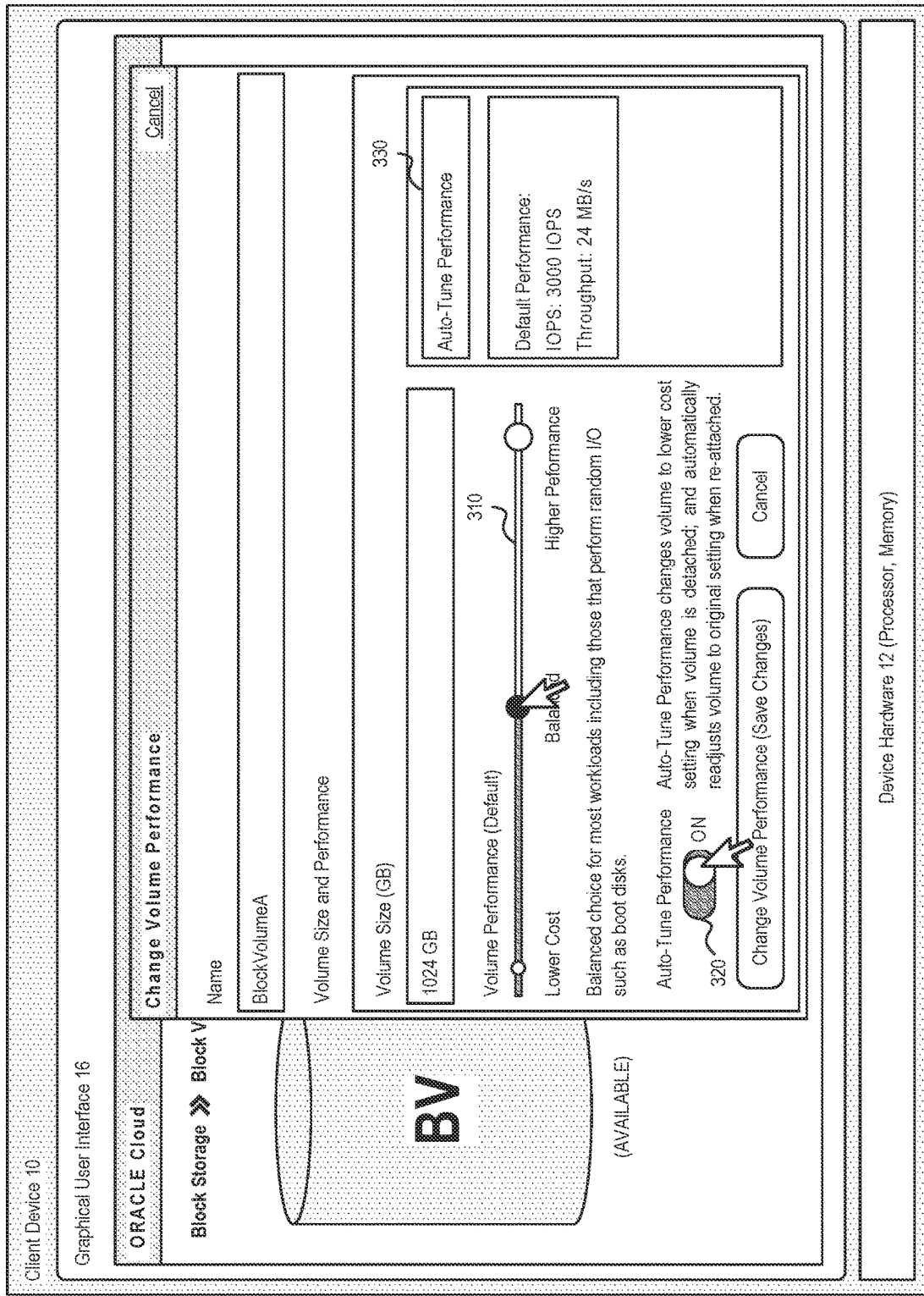
FIG. 16 further illustrates an example user interface, in accordance with an embodiment.

As shown in FIG. 16, when auto-tune is selected the system can display in an auto-tune performance window 330 an indication of the default performance associated with the e data/block volume.

In accordance with an embodiment, if performance auto-tune is enabled, when the data/block volume is attached to one or more cloud instances, the data/block volume's performance will be the default performance setting. When the data/block volume is detached, the data storage service will adjust the performance setting to lower cost, for both data/block volumes and boot data/block volumes. When the data/block volume is reattached, the performance is adjusted back to the default performance setting.

Figure 17:
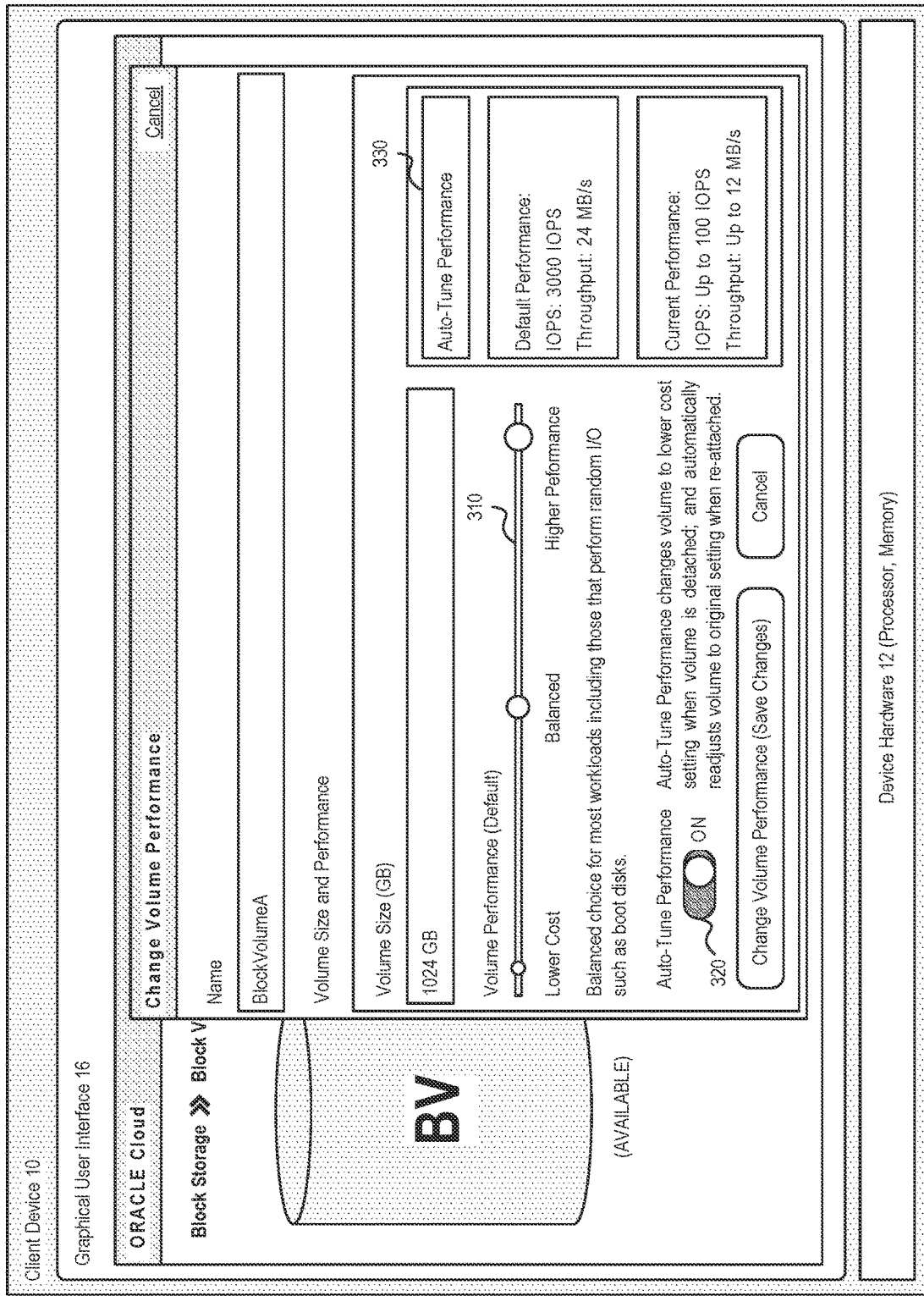
FIG. 17 further illustrates an example user interface, in accordance with an embodiment.

FIG. 17 further illustrates an example user interface, in accordance with an embodiment.

As illustrated in FIG. 17, when the data/block volume is detached, the performance is adjusted, the current performance can be indicated in the auto-tune windows.

Detaching a data/block volume: when a data/block volume is detached, and there are no other attachments for the same data/block volume (for the multi-attach case), the system will automatically set the performance option to lower cost upon the last detachment for the data/block volume. the system will remember the last performance setting before lowering the performance to lower cost option, so that when the data/block volume is re-attached, it will be set to the same performance level by default, and customer/user will have an option to set a different performance option.

Attaching a data/block volume: if it is the first attachment done for the data/block volume, then the system will use the data/block volume performance configuration set by the user as it is in production currently. For detached data/block volumes, the system will remember the last performance option prior to detachment, and set the same level of performance by default.

Figure 18:
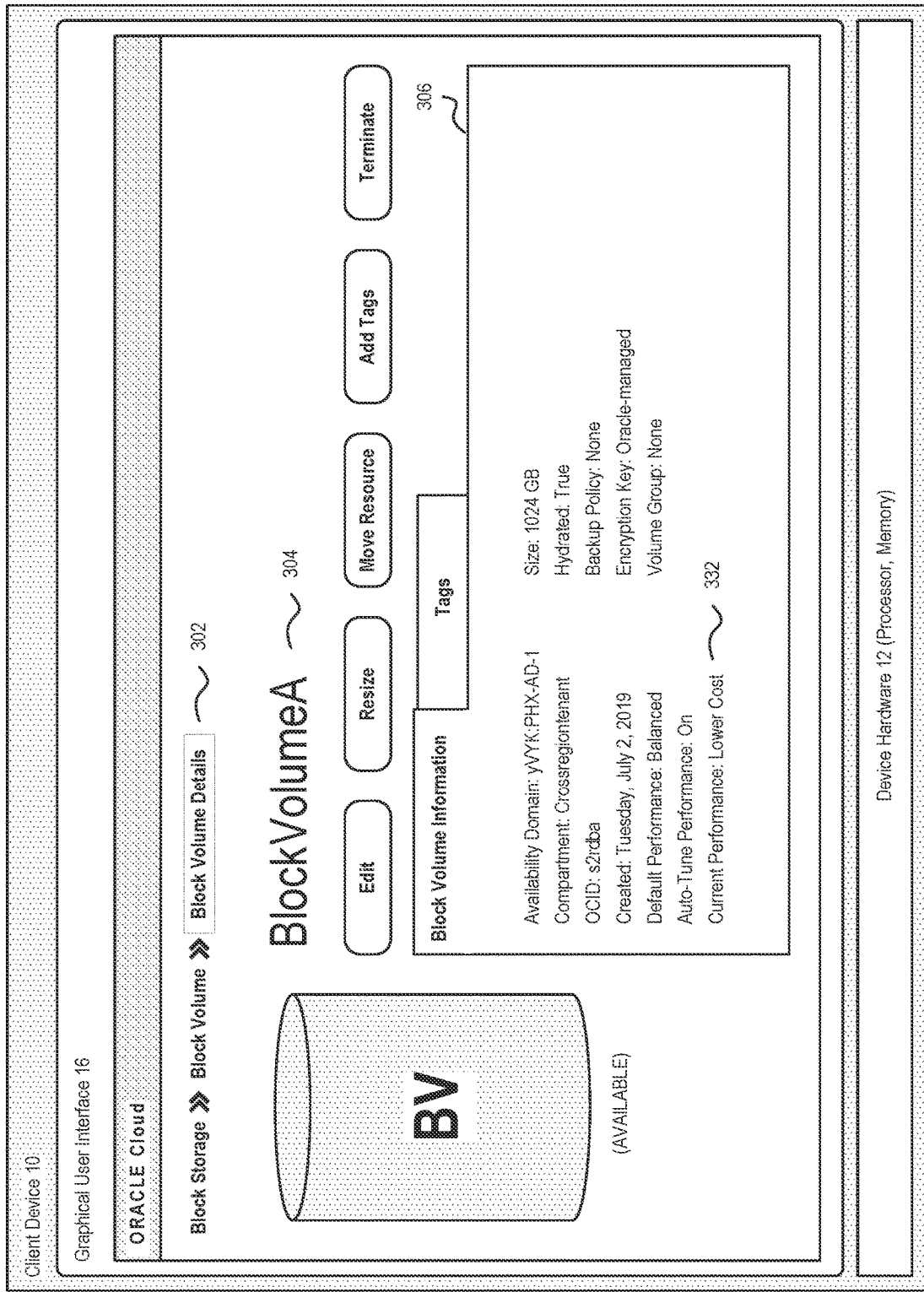
FIG. 18 further illustrates an example user interface, in accordance with an embodiment.

FIG. 18 further illustrates an example user interface, in accordance with an embodiment.

As illustrated in FIG. 18, the configuration for a data/block volume can be updated to display the default performance as indicated by the slider bar, and the current performance as determined by the auto-tune process 332. When viewing the data/block volume details or boot data/block volume details pages in the console, the applicable fields are:

Current Performance: the data/block volume's effective performance. if the auto-tune performance feature is disabled for the data/block volume, the current performance will always be what is specified in the default performance, regardless of whether the data/block volume is attached or detached. if the auto-tune performance feature is enabled for the data/block volume, the current performance will be adjusted to lower cost when the data/block volume is detached.

Default Performance: this is the data/block volume's performance setting specify when the customer create the data/block volume or when they change the performance setting for an existing data/block volume. When the data/block volume is attached, regardless of whether the auto-tune performance feature is enabled or not, this is the data/block volume's performance.

Auto-tune Performance: this field indicates whether the auto-tune performance feature is enabled for the data/block volume. When it is off, the data/block volume's effective performance is always the same as what is specified for default performance. When it is on, the data/block volume performance is adjusted to lower cost when the data/block volume is detached.

Figure 19:
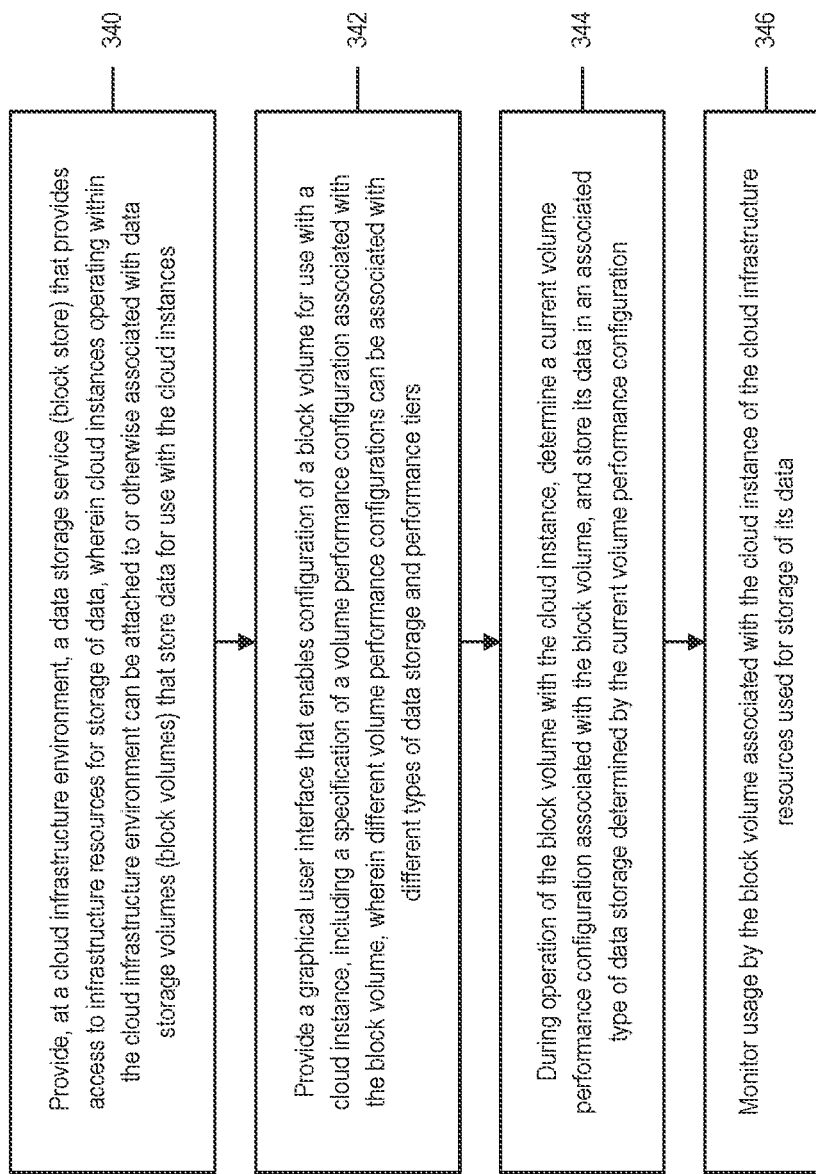
FIG. 19 illustrates a method or process for configuring tiered data storage, in accordance with an embodiment.

FIG. 19 illustrates a method or process for configuring tiered data storage, in accordance with an embodiment.

As illustrated in FIG. 19, in accordance with an embodiment, at step 340, a data storage service (block store), provided at a cloud infrastructure environment, provides access to infrastructure resources for storage of data, wherein cloud instances operating within the cloud infrastructure environment can be attached to or otherwise associated with data/block volumes that store data for use with the cloud instances.

At step 342, a graphical user interface is provided, that enables configuration of a data/block volume associated with a cloud instance, including a specification of a data/block volume performance configuration associated with the data/block volume, wherein different data/block volume performance configurations can be associated with different types of data storage and performance tiers.

At step 344, during operation of the data/block volume with the cloud instance, the system determines a current data/block volume performance configuration associated with the data/block volume, and stores its data in an associated type of data storage determined by the current data/block volume performance configuration.

At step 346, the system monitors usage, by the data/block volume associated with the cloud instance, of the cloud infrastructure resources used for storage of its data.

Figure 20:
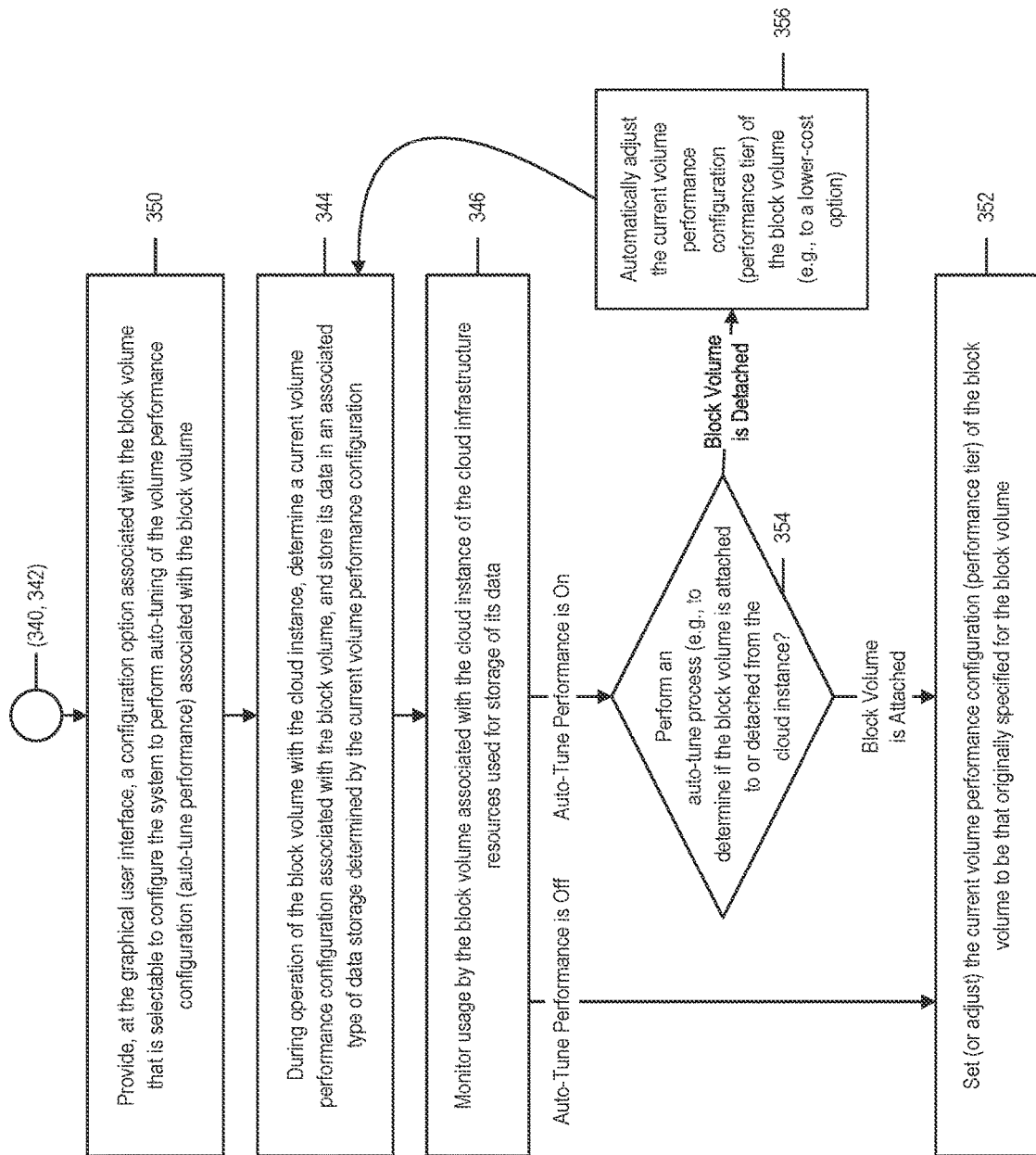
FIG. 20 illustrates an additional method or process for configuring tiered data storage, in accordance with an embodiment.

FIG. 20 illustrates an additional method or process for configuring tiered data storage, in accordance with an embodiment.

As illustrated in FIG. 20, in accordance with an embodiment, at steps 340, 342, the process operates as described above.

At step 350, the graphical user interface provides a configuration option associated with the data/block volume that is selectable to configure the system to perform automatic tuning of the data/block volume performance configuration (auto-tune performance) associated with the data/block volume.

At step 352, if auto-tune performance is not set (i.e., OFF), then the system sets (or adjusts) the current data/block volume performance configuration (performance tier) of the data/block volume to be that originally specified for the data/block volume.

At step 354, if auto-tune performance is set (i.e., ON), then the system performs an auto-tune process (e.g., to determine if the data/block volume is attached to or detached from the cloud instance.

In accordance with an embodiment, if the data/block volume is determined to be attached to the cloud instance, then the system sets (or adjusts) the current data/block volume performance configuration (performance tier) of the data/block volume to be that originally specified for the data/block volume (352). However, if the data/block volume is determined to be detached from the cloud instance then, at step 356, the system automatically adjusts the current data/block volume performance configuration (performance tier) of the data/block volume (e.g., to a lower-cost option).

The above process can then continue or repeat, for example from step 344, including during operation of the data/block volume with the cloud instance, determining a current data/block volume performance configuration associated with the data/block volume, and storing its data in an associated type of data storage determined by the current data/block volume performance configuration, and continuing to monitor usage, by the data/block volume associated with the cloud instance, of the cloud infrastructure resources used for storage of its data.

Automatic Block Storage Volume Tier Tuning

As described above, enterprise customers may seek different data storage options, each of which are generally associated with a range of costs, to achieve desired data performance and availability for various types of data and applications. For example, a "lower cost" tier may be suitable for workloads that are cost-sensitive; while a "balanced" tier offers a balanced choice for most workloads; and a "higher performance" tier may be recommended for the most 10-demanding workloads that require the best possible performance.

In accordance with an embodiment, described herein are systems and methods for automatic block storage volume tuning by simulating usage characteristics for data/block volumes. The block storage performance associated with usage by a cloud instance of a block volume can be simulated, and the manner in which data is stored or cached, for example within a combination of SSD/NVMe block storage and/or HDD object storage, can be automatically adjusted, for example to associate the block volume with a particular volume performance tier.

The described approach allows the system to tune block volume performance in a dynamic manner, without further manual input from a user—the volume performance can be automatically increased when the user needs it, and otherwise reduced down to save costs (both for the user and the cloud provider). A user can enable tuning on a particular block volume, and thereafter automatically receive appropriate price/performance characteristics.

For example, in accordance with an embodiment, the system can perform automatic tuning of performance tiers associated with volumes, such that when a data/block volume is attached to one or more cloud instances, the data/block volume's performance can be the default performance setting; when the data/block volume is detached, the data storage service can adjust the performance setting to lower cost, for both data/block volumes and boot data/block volumes; when the data/block volume is reattached, the performance can be adjusted back to the default performance setting.

As another example, in accordance with an embodiment, the system can perform automatic tuning of performance tiers associated with volumes based on a schedule, or a simulation of a schedule associated with usage of a data/block volume.

As another example, in accordance with an embodiment, the system can perform automatic tuning of performance tiers associated with volumes based on performance criteria that are monitored for each volume, such as volume IOPS (Input/Output Operations Per Second), throughput, or latency, or a simulation of performance criteria associated with usage of a data/block volume.

As another example, in accordance with an embodiment, the system can perform automatic tuning of performance tiers associated with volumes based on detection of events, or a simulation of events associated with usage of a data/block volume.

Figure 21:
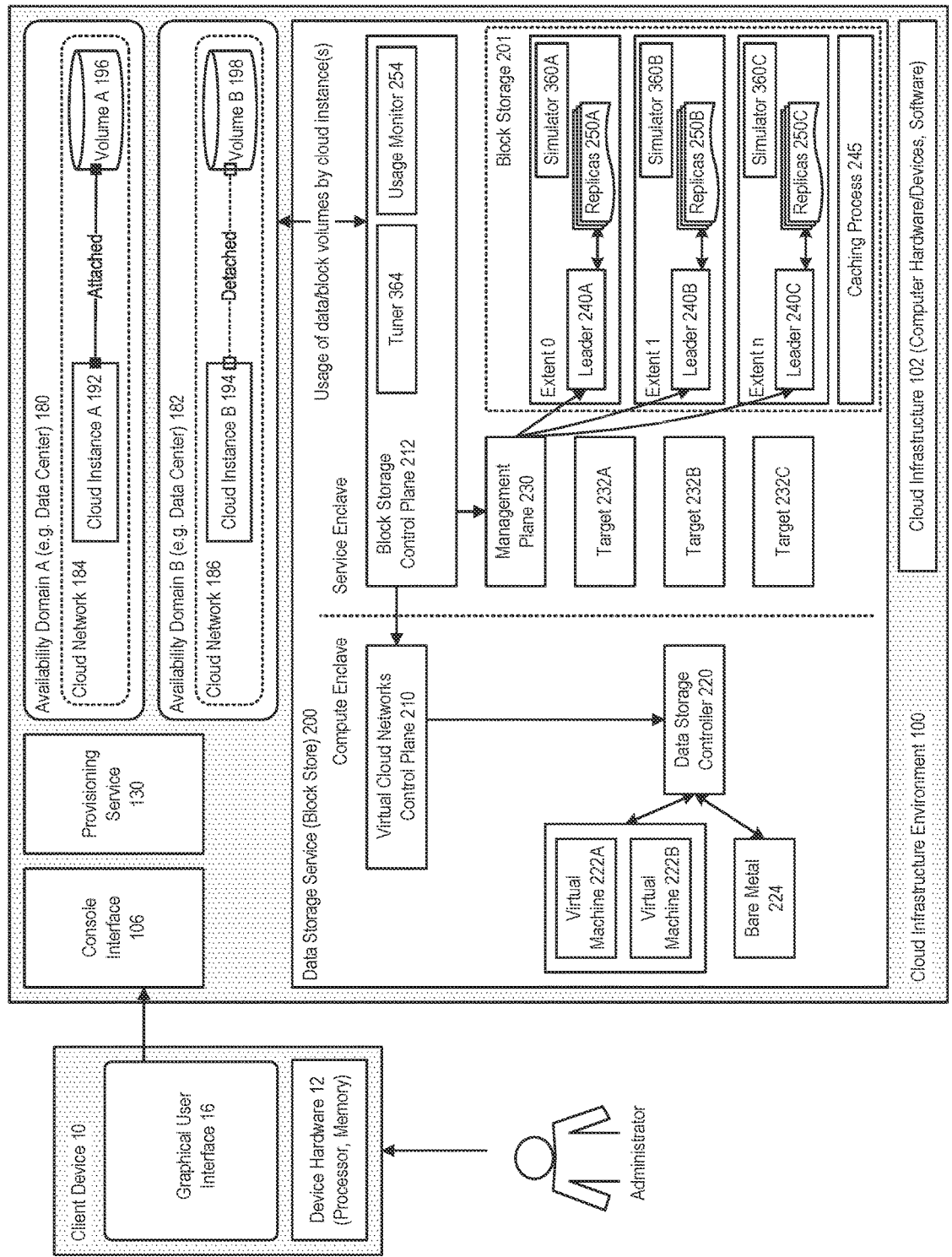
FIG. 21 illustrates a data storage service that includes support for automatic block storage volume tier tuning by simulating usage characteristics for a data/block volume, in accordance with an embodiment.

FIG. 21 illustrates a data storage service that includes support for automatic block storage volume tier tuning by simulating usage characteristics for a data/block volume, in accordance with an embodiment.

As illustrated in FIG. 21, in accordance with an embodiment as described above, data/block volumes associated and/or used with cloud instances can be sharded into extents, wherein each extent is a unit of management and replication and includes a leader that provides access to data stored in replicas and under control of a caching process.

In accordance with an embodiment, the extent leader knows which blocks are available on which replicas within its extent, and will blocks to unmap from some or all replicas based on the caching policy. For example, the leader's cache data structure can be used to determine which blocks to keep after a data upload completes, and which blocks to evict first when caching reads (and/or writes) after cache misses.

In accordance with an embodiment, each of a plurality of extents can be associated with a simulator component or process 360A, 360B, 360C, that evaluates the extent and its replicas similarly to the extent leader, i.e., by performing a simulation of caching process—but without performing any actual evictions from the cache.

Instead, in accordance with an embodiment, the simulator provided within each extent provides an assessment as to how many cache misses there would likely be if a particular caching policy was applied, for example if a particular block volume was associated with a particular cache fraction. Each simulator then reports its information to the management plane, which aggregates data from the plurality of extents/simulators, and provides the information to the control plane.

In accordance with an embodiment, the usage monitor in the control plane receives the aggregated data from the extents/simulators via the management plane, and operates with a tuner 364 in the control plane to determine, based on the aggregated data whether a particular block volume should be tuned, based on its usage characteristics.

In accordance with an embodiment, executor processes can also be provided by application program interfaces (APIs) that enable, for example, converting or restoring the volumes, as driven by the control plane. An executor process can be associated with particular steps to configure a block volume, based on an evaluation of its anticipated workflow, to reach the desired stage in tuning, or to match a particular volume performance tier.

Figure 22:
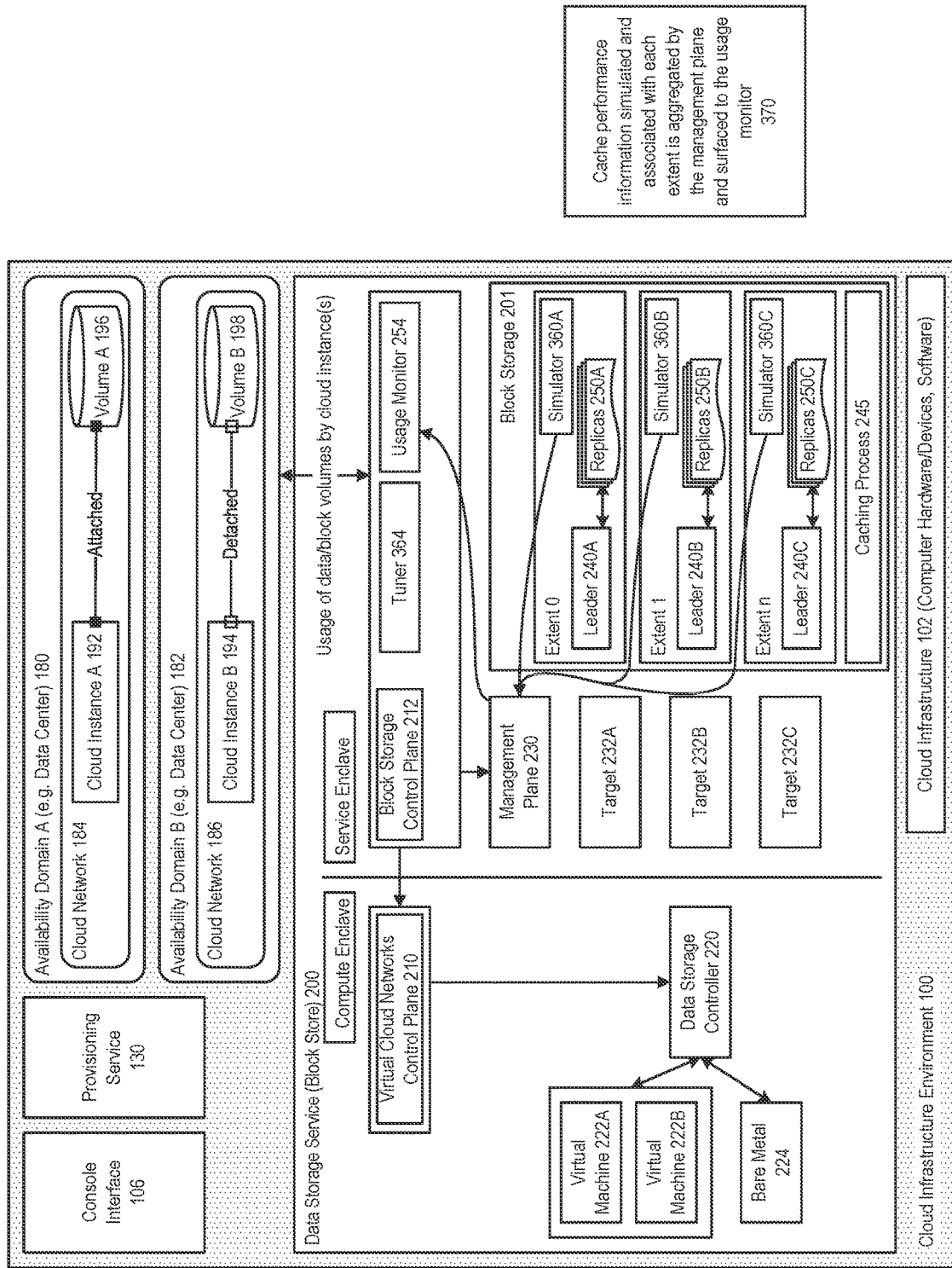
FIG. 22 further illustrates support for automatic block storage volume tier tuning by simulating usage characteristics, in accordance with an embodiment.

FIG. 22 further illustrates support for automatic block storage volume tier tuning by simulating usage characteristics, in accordance with an embodiment.

As illustrated in FIG. 22, in accordance with an embodiment, cache performance information simulated and associated with each extent can be aggregated by the management plane and surfaced to the usage monitor 370.

Figure 23:
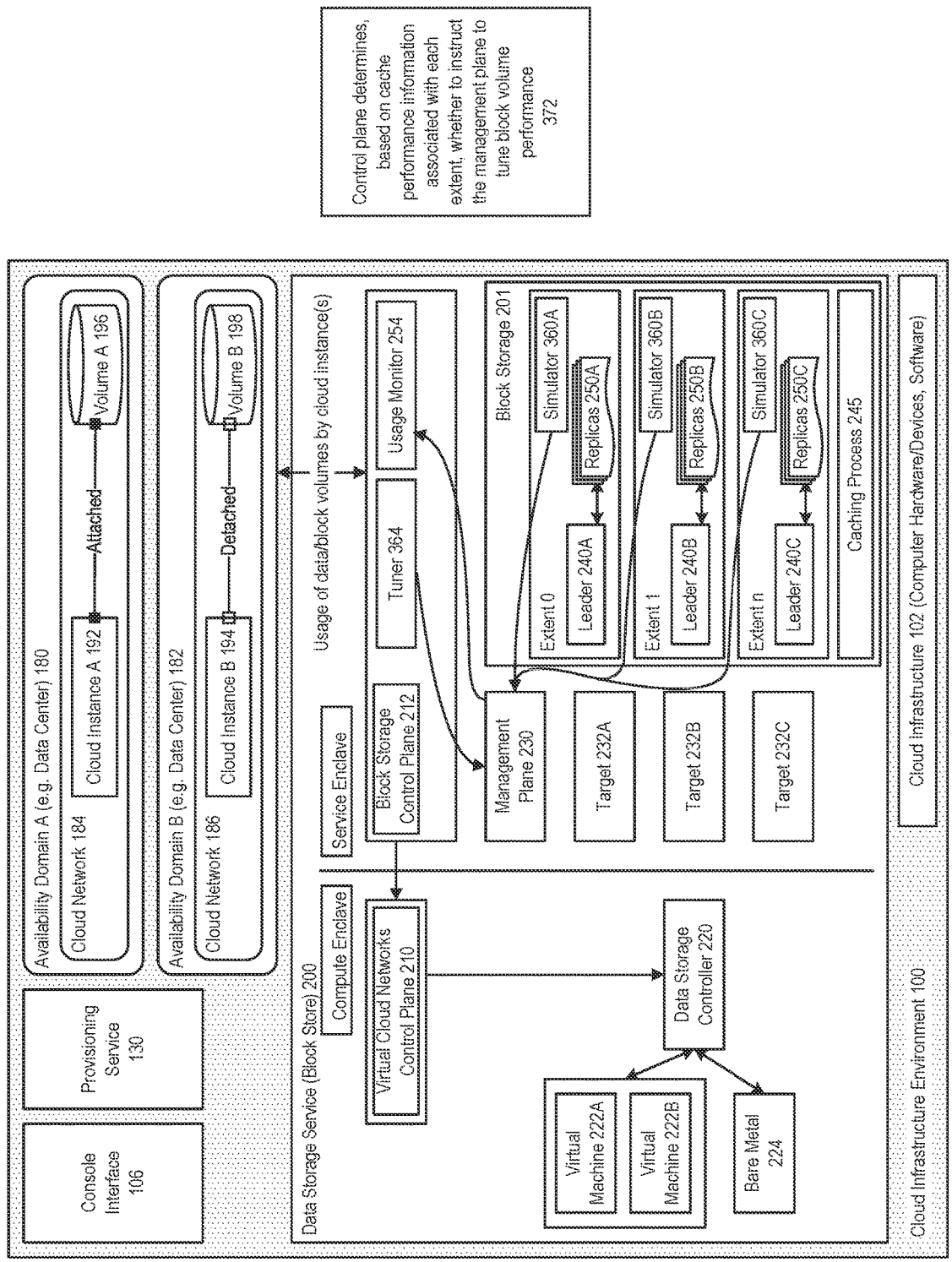
FIG. 23 further illustrates support for automatic block storage volume tier tuning by simulating usage characteristics, in accordance with an embodiment.

FIG. 23 further illustrates support for automatic block storage volume tier tuning by simulating usage characteristics, in accordance with an embodiment.

As illustrated in FIG. 23, in accordance with an embodiment, the control plane can determine, based on cache performance information associated with each extent, whether to instruct the management plane to tune the block volume performance 372.

Figure 24:
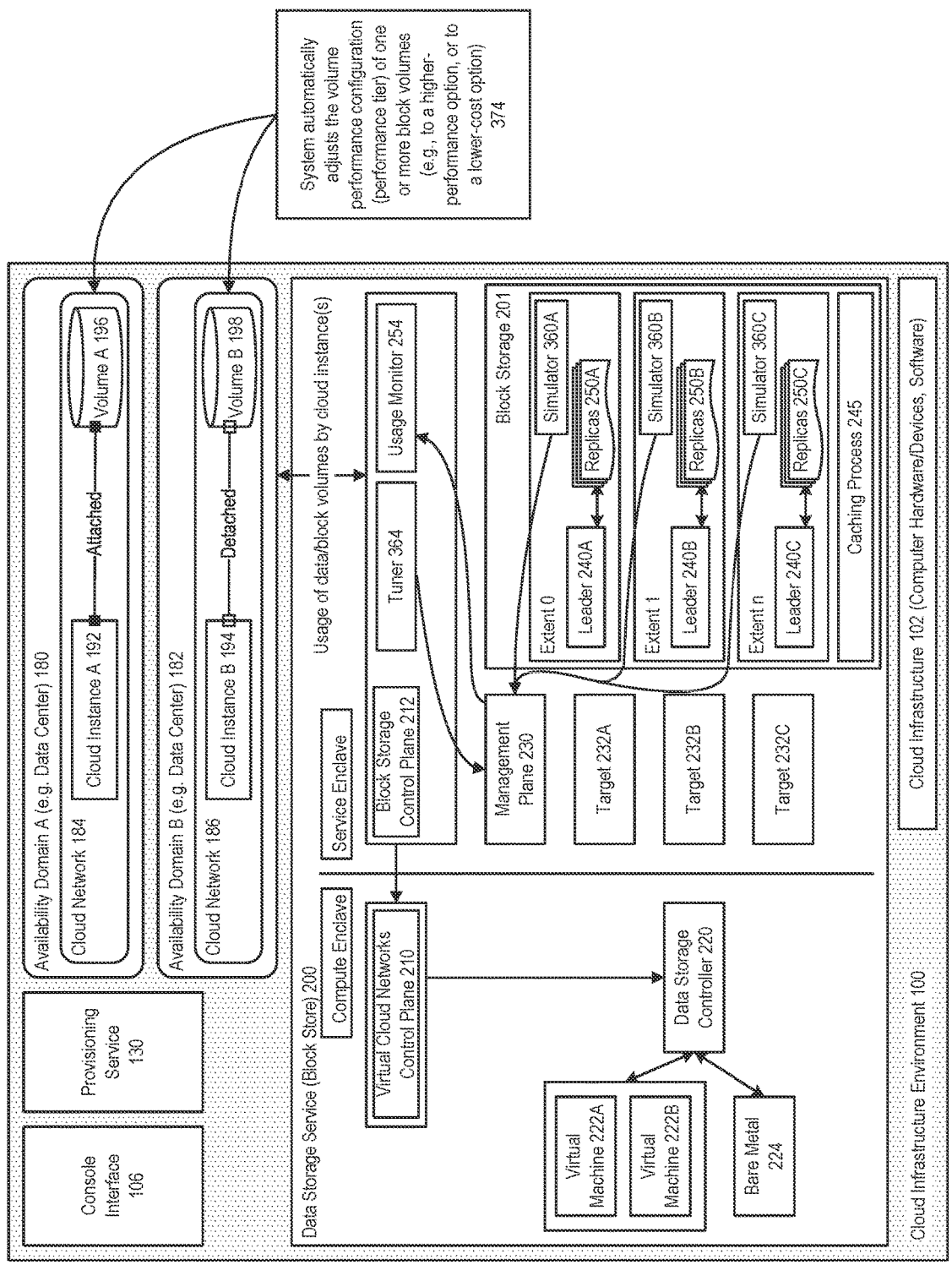
FIG. 24 further illustrates support for automatic block storage volume tier tuning by simulating usage characteristics, in accordance with an embodiment.

FIG. 24 further illustrates support for automatic block storage volume tier tuning by simulating usage characteristics, in accordance with an embodiment.

As illustrated in FIG. 24, in accordance with an embodiment, the system can automatically adjust the volume performance configuration (performance tier) of one or more block volumes (e.g., to a higher-performance option, or to a lower-cost option) 374.

For example, in accordance with an embodiment, when auto-tune is enabled for a data/block volume, the system can monitor the data/block volume usage, to determine, for example, that the data/block volume includes periods during which the volume is detached, or is associated with particular performance criteria, and based on a simulating and evaluating such workflow, determine that the data/block volume should be associated with a particular volume performance tier, to suit its anticipated workflow.

In accordance with an embodiment, a technical advantage of the described approach includes minimizing cache misses. For example, as described above the simulator provided within each extent can provide an assessment as to how many cache misses there would likely be if a particular caching policy was applied, which can be used to determine whether a particular block volume should be tuned, based on its usage characteristics, to minimize such cache misses.

In accordance with other embodiments, the described approach can be used to provide other technical advantages, such as, for example, avoiding heavy throttling. For example, in some instances, the lower cost tier may exhibit poor performance due to object storage latency and bandwidth limits for certain workloads. The simulator provided within each extent can provide an assessment as to how the block volume is likely to perform at different performance tiers, for example to determine if a volume would perform reasonably in a lower cost tier.

In accordance with an embodiment, the simulator, usage monitor, and executor processes can use information received from the block store, to determine, for example, whether to move a particular block volume from higher to a lower performance tier; or whether to adjust a cache fraction associated with a particular block volume, to control how the data for that block store is stored in NVMe vs object storage, wherein for example a cache fraction of 100% would result in the system retaining one replica in NVMe storage rather than three replicas—to provide the durability of object storage, and the performance of NVMe, to suit the anticipated workflow associated with that block volume, and within a particular performance tier.

For example, in accordance with an embodiment, the described approach can be used to control or indicate the use of a lower tier for a detached data/block volume. For example, as described above, when a data/block volume is detached and idle for certain period of time, the data storage service (block store) can use the information provided by the simulators to determine whether to reclaim resources associated with an idle data/block volume, for example to tune the data/block volume to 100% cache fraction, i.e., how much kept in SSD/NVMe versus object storage, where 100% means keeping one replica in SSD/NVMe storage rather than three replicas—which provides the durability of object storage but the performance of SSD/NVMe.

In accordance with an embodiment, automatic tuning of performance tiers associated with data/block volumes can be provided in different forms that are either visible to an end user, or provided automatically within the system, such as, for example:

Service Optimization/Tuning: In accordance with an embodiment, automatic block storage volume tier tuning can be provided as an internal tuning mechanism, where the block service will optimize for its sellable capacity. These changes are not visible to the user, and on first use the volume will be revived for customers, including, for example, keeping a single replica for detached volumes.

User-Aware Tuning: In accordance with an embodiment, automatic block storage volume tier tuning can be provided as a feature which is user-visible, and which the user can control. For example, a user can receive (and see) cost savings when a detached volume is backed up and deleted.

Usage-Based Tuning: In accordance with an embodiment, automatic block storage volume tier tuning can be provided as user-aware changes that are then applied to the volume when it is in use, such as, for example, increasing throughput or changing tiers.

Idle Tuning: In accordance with an embodiment, automatic block storage volume tier tuning can be provided as changes driven by the user (for example, based on the tenant policy), or internally by the system, to optimize performance.

Automatic Data/Block Volume Tier Tuning Based on a Schedule

In accordance with an embodiment, the system can perform automatic tuning of performance tiers associated with volumes based on a schedule, or a simulation of a schedule associated with usage of a data/block volume.

Figure 25:
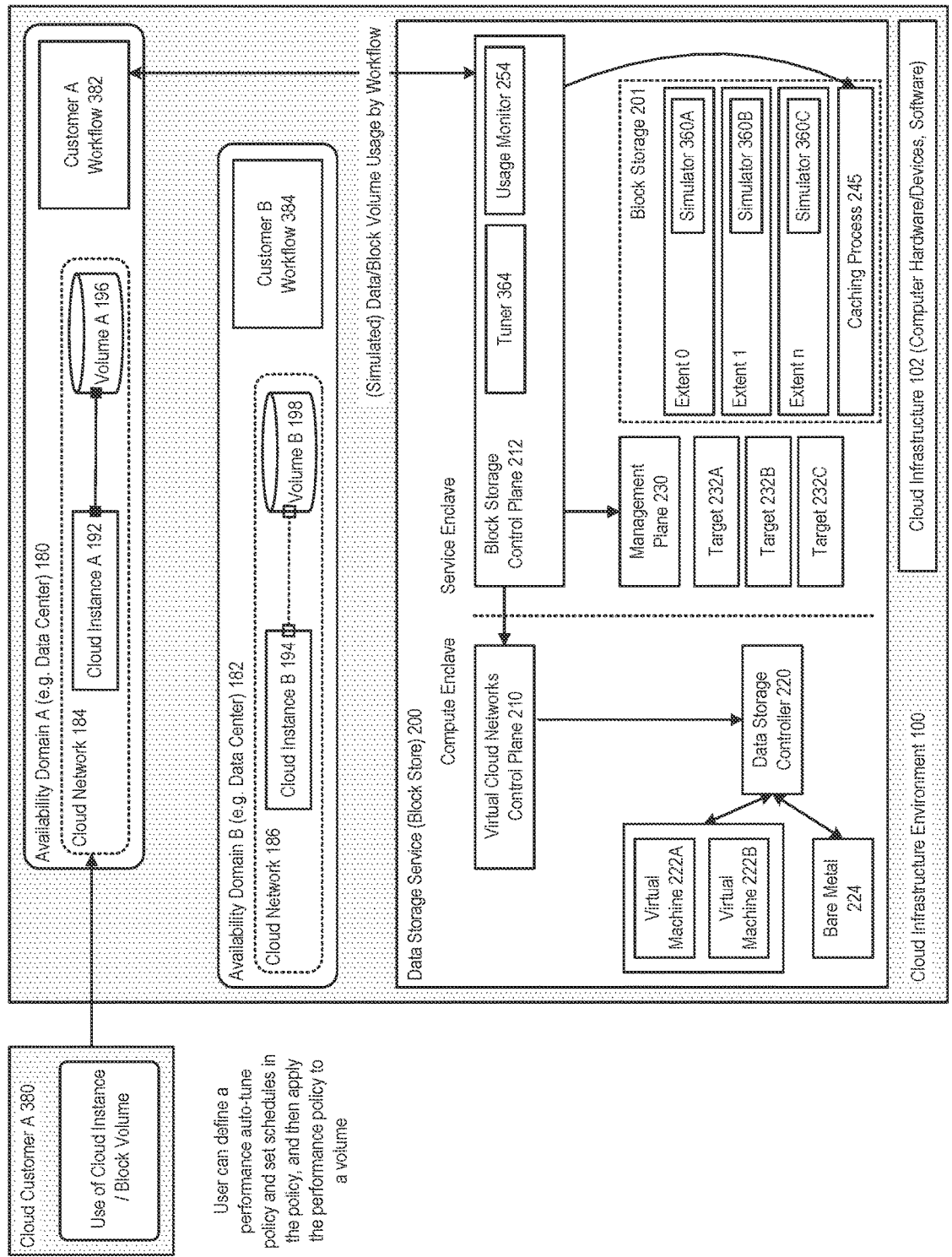
FIG. 25 illustrates a data storage service for use in a cloud infrastructure environment, including support for automatic tuning of performance tiers based on a schedule, in accordance with an embodiment.

FIG. 25 illustrates a data storage service for use in a cloud infrastructure environment, including support for automatic tuning of performance tiers based on a schedule, in accordance with an embodiment.

As illustrated in FIG. 25, in accordance with an embodiment, users/customers of cloud instances, for example customer A 380, can be associated with a customer (A) workflow 382 by which a data block/volume associated with the cloud instance is used. Other customers can be associated with other cloud instances, data block/volumes, and workflows (384) by which their data block/volumes are used.

In accordance with an embodiment, when automatic tuning of performance tiers is based on a schedule, the user can define a performance auto-tune policy and set schedules in the policy, and then apply the performance policy to a volume. Performance policy creation and assignment will resemble a "custom backup policies and schedules" experience, with multiple minute, hour, day, week, month and year schedules. Customers will have an option to set multiple schedules in an auto-tune policy, and applying that policy to their volumes for their automatic performance/cost management on schedules.

In accordance with an embodiment, the system can then can then, based on simulating and evaluating the workflow associated with the data/block volume, determine that the data/block volume should be associated with a particular volume performance tier, to suit its anticipated workflow.

Figure 26:
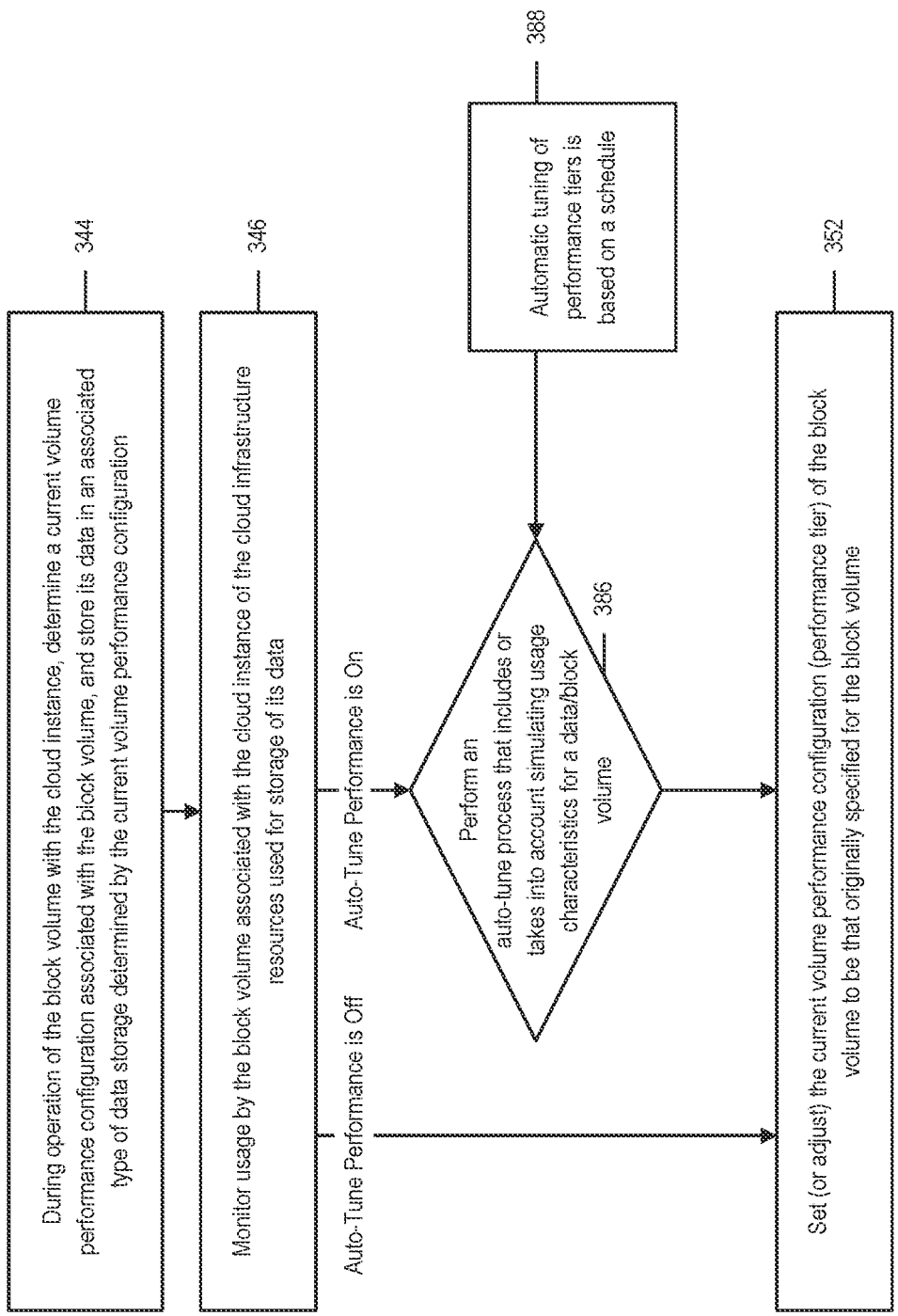
FIG. 26 illustrates a method or process for automatic tuning of performance tiers based on a schedule, in accordance with an embodiment.

FIG. 26 illustrates a method or process for automatic tuning of performance tiers based on a schedule, in accordance with an embodiment.

As illustrated in FIG. 26, in accordance with an embodiment, at steps 344, 346, 352, the process operates as described above.

In accordance with an embodiment, at step 386, the auto-tune process includes or takes into account simulating usage characteristics for a data/block volume. At step 388, when automatic tuning of performance tiers is based on a schedule, the user can define a performance auto-tune policy and set schedules in the policy, and then apply the performance policy to a volume, for use by the system in providing the automatic tuning of performance tiers Automatic Data/Block Volume Tier Tuning Based on Performance Criteria In accordance with an embodiment, the system can perform automatic tuning of performance tiers associated with volumes based on performance criteria that are monitored for each volume, such as volume IOPS, throughput, or latency, or a simulation of performance criteria associated with usage of a data/block volume.

Figure 27:
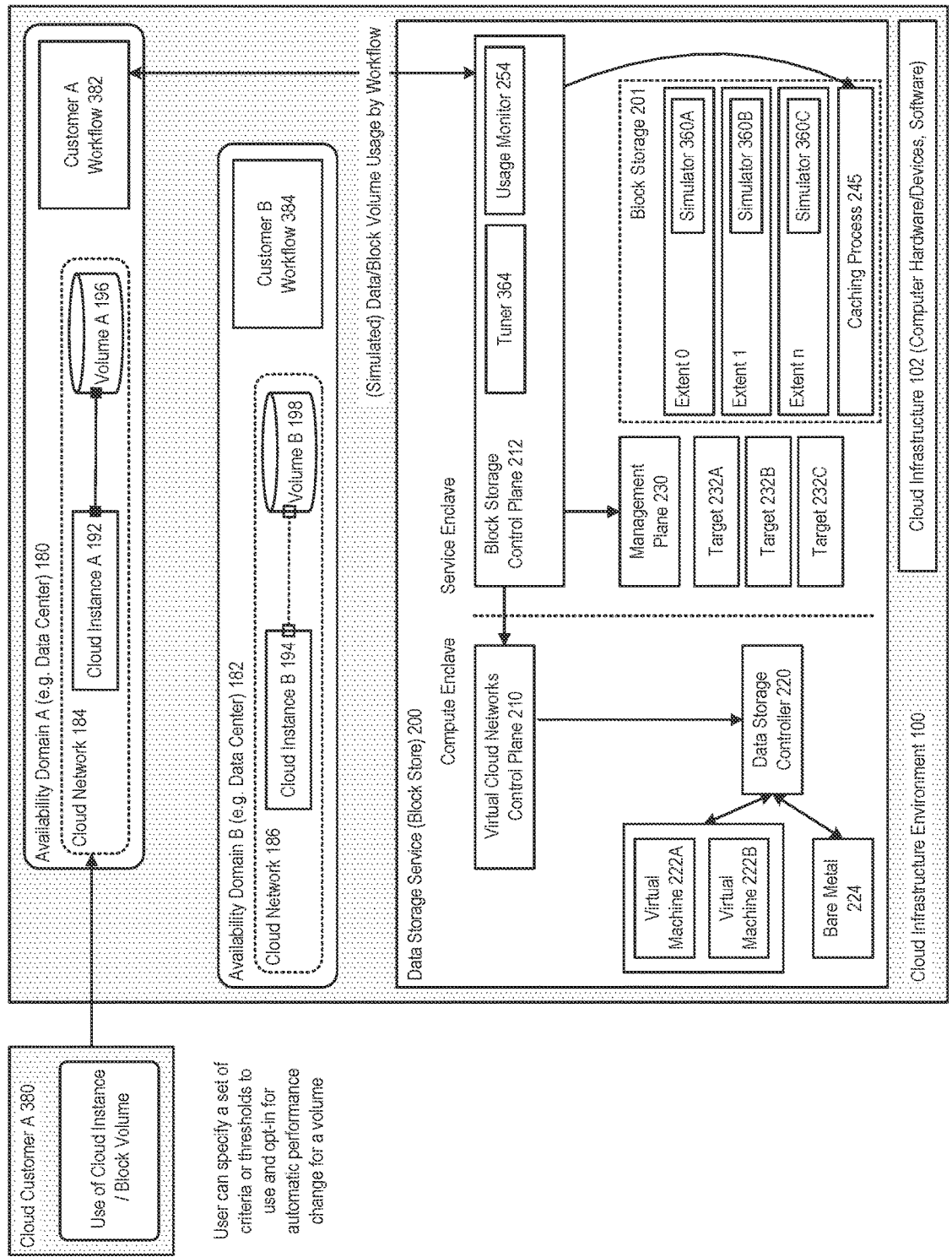
FIG. 27 illustrates a data storage service for use in a cloud infrastructure environment, including support for automatic tuning of performance tiers based on performance criteria, in accordance with an embodiment.

FIG. 27 illustrates a data storage service for use in a cloud infrastructure environment, including support for automatic tuning of performance tiers based on performance criteria, in accordance with an embodiment.

As illustrated in FIG. 27, in accordance with an embodiment, when automatic tuning of performance tiers is based on performance criteria, a user can specify a set of criteria or thresholds to use and opt-in for automatic performance change for a volume. For example, such criteria or thresholds could include:

Current IOPS/max IOPS Percentage: In this example, 1. The user can specify a % IOPS headroom from maximum value for the tier, to trigger a performance change to a higher tier accordingly. 2. The user can specify a % IOPS headroom from minimum value for the tier, to trigger a performance change to a lower tier accordingly.

Current Throughput/max Throughput Percentage. In this example, 1. The user can specify a % Throughput headroom from maximum value for the tier, to trigger a performance change to a higher tier accordingly. 2. The user can specify a % Throughput headroom from minimum value for the tier, to trigger a performance change to a lower tier accordingly.

Current Latency/max Latency Percentage. In this example, 1. The user can specify a % Latency headroom from maximum value for the tier, to trigger a performance change to a higher tier accordingly. 2. The user can specifies a % Latency headroom from minimum value for the tier, to trigger a performance change to a lower tier accordingly.

The above examples are provided for purposes of illustration; in accordance with various embodiment, other examples can be provided/supported.

In accordance with an embodiment, the system can then, based on simulating and evaluating the workflow associated with the data/block volume, determine that the data/block volume should be associated with a particular volume performance tier, to suit its anticipated workflow.

Figure 28:
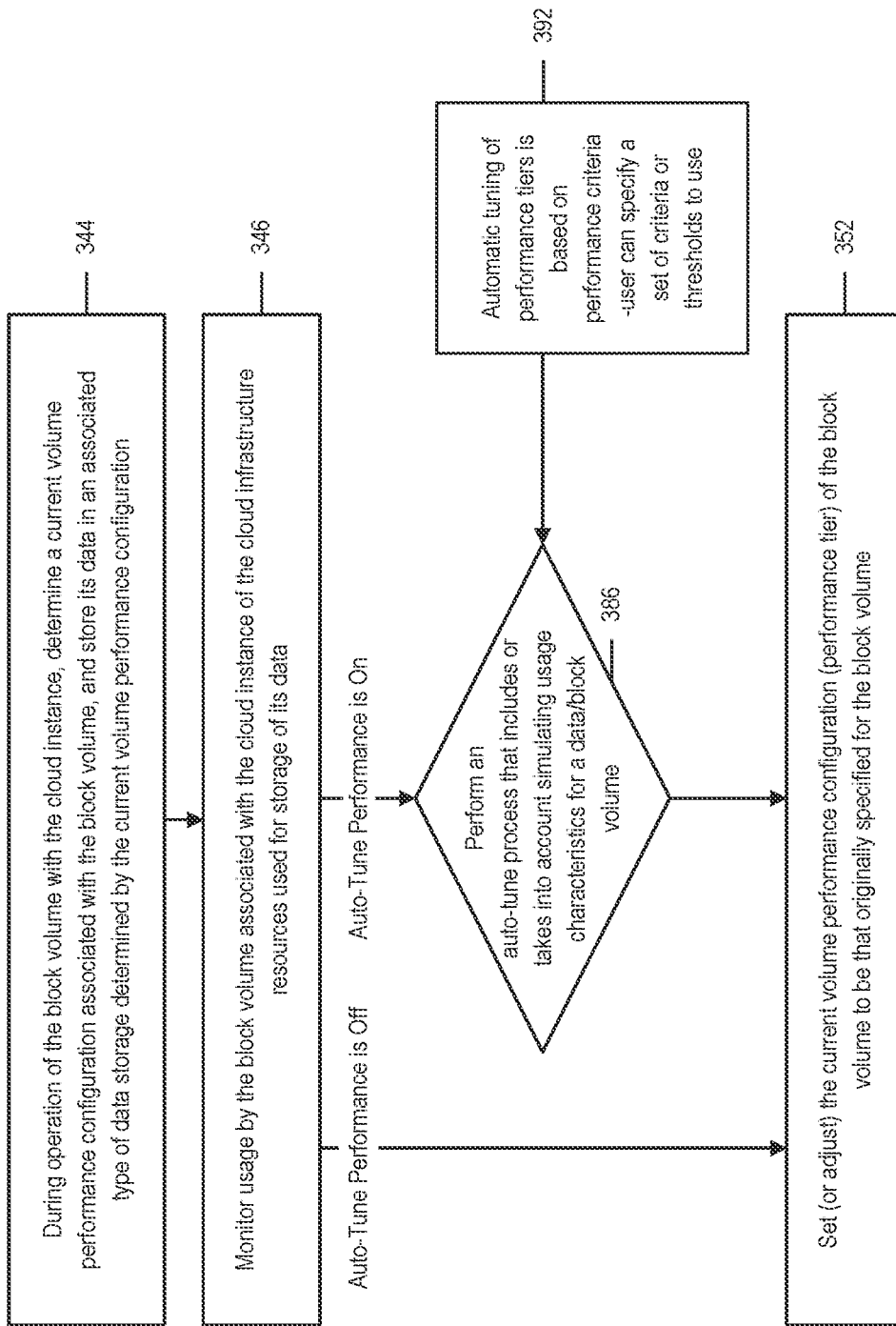
FIG. 28 illustrates a method or process for automatic tuning of performance tiers based on performance criteria, in accordance with an embodiment.

FIG. 28 illustrates a method or process for automatic tuning of performance tiers based on performance criteria, in accordance with an embodiment.

As illustrated in FIG. 28, in accordance with an embodiment, at steps 344, 346, 352, 386, the process operates as described above.

In accordance with an embodiment, at step 392, when automatic tuning of performance tiers is based on performance criteria, a user can specify a set of criteria or thresholds to use and opt-in for automatic performance change for a volume, for use by the system in providing the automatic tuning of performance tiers.

Automatic Data/Block Volume Tier Tuning Based on Detection of Events

As another example, in accordance with an embodiment, the system can perform automatic tuning of performance tiers associated with volumes based on detection of events, or a simulation of events associated with usage of a data/block volume.

Figure 29:
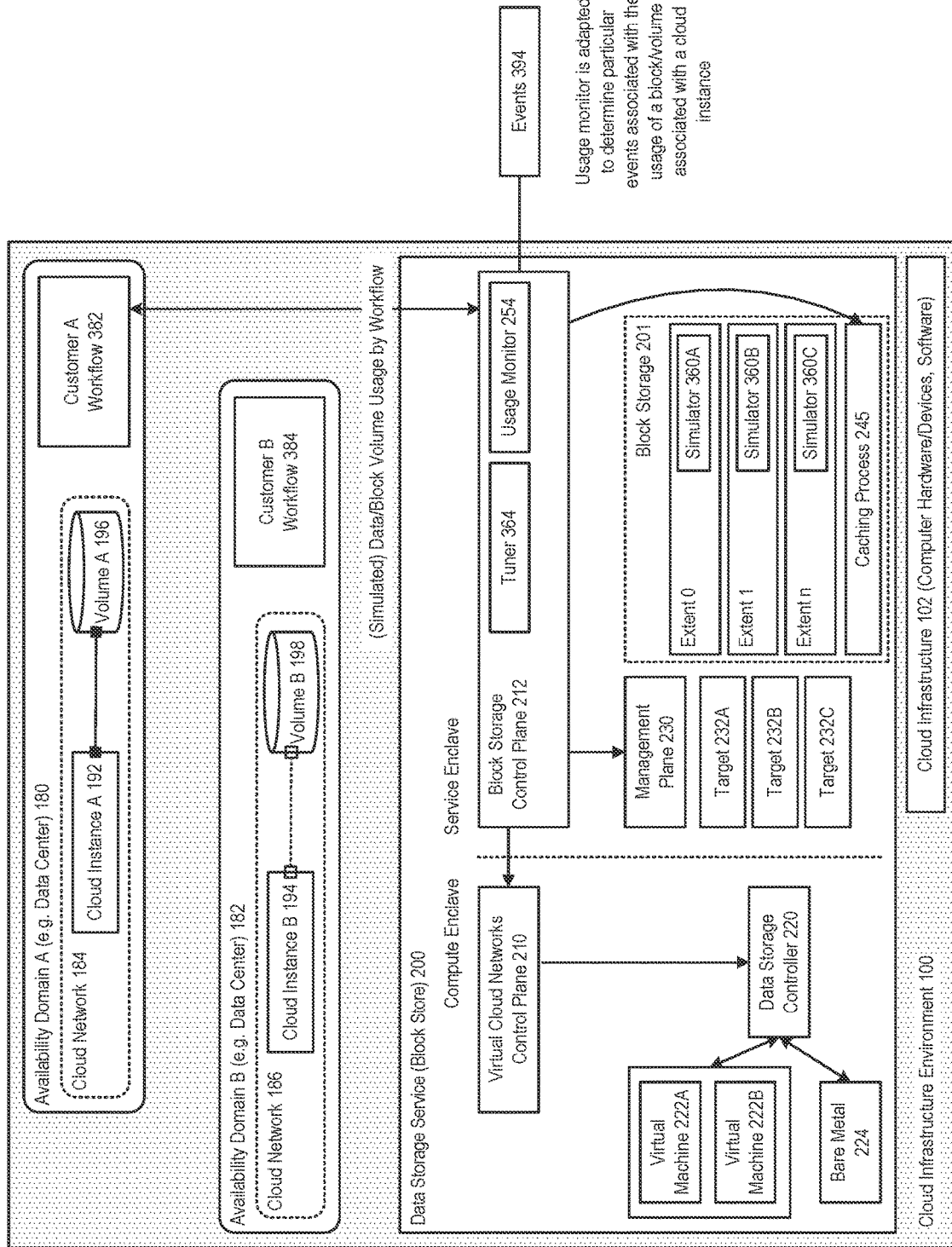
FIG. 29 illustrates a data storage service for use in a cloud infrastructure environment, including support for automatic tuning of performance tiers based on detection of events, in accordance with an embodiment.

FIG. 29 illustrates a data storage service for use in a cloud infrastructure environment, including support for automatic tuning of performance tiers based on detection of events, in accordance with an embodiment.

As illustrated in FIG. 29, in accordance with an embodiment, when automatic tuning of performance tiers is based on detection of events, the usage monitor can be adapted to determine particular events 394 associated with the usage of a block/volume associated with a cloud instance. The system can then, based on simulating and evaluating the workflow associated with the data/block volume, determine that the data/block volume should be associated with a particular volume performance tier, to suit its anticipated workflow.

Figure 30:
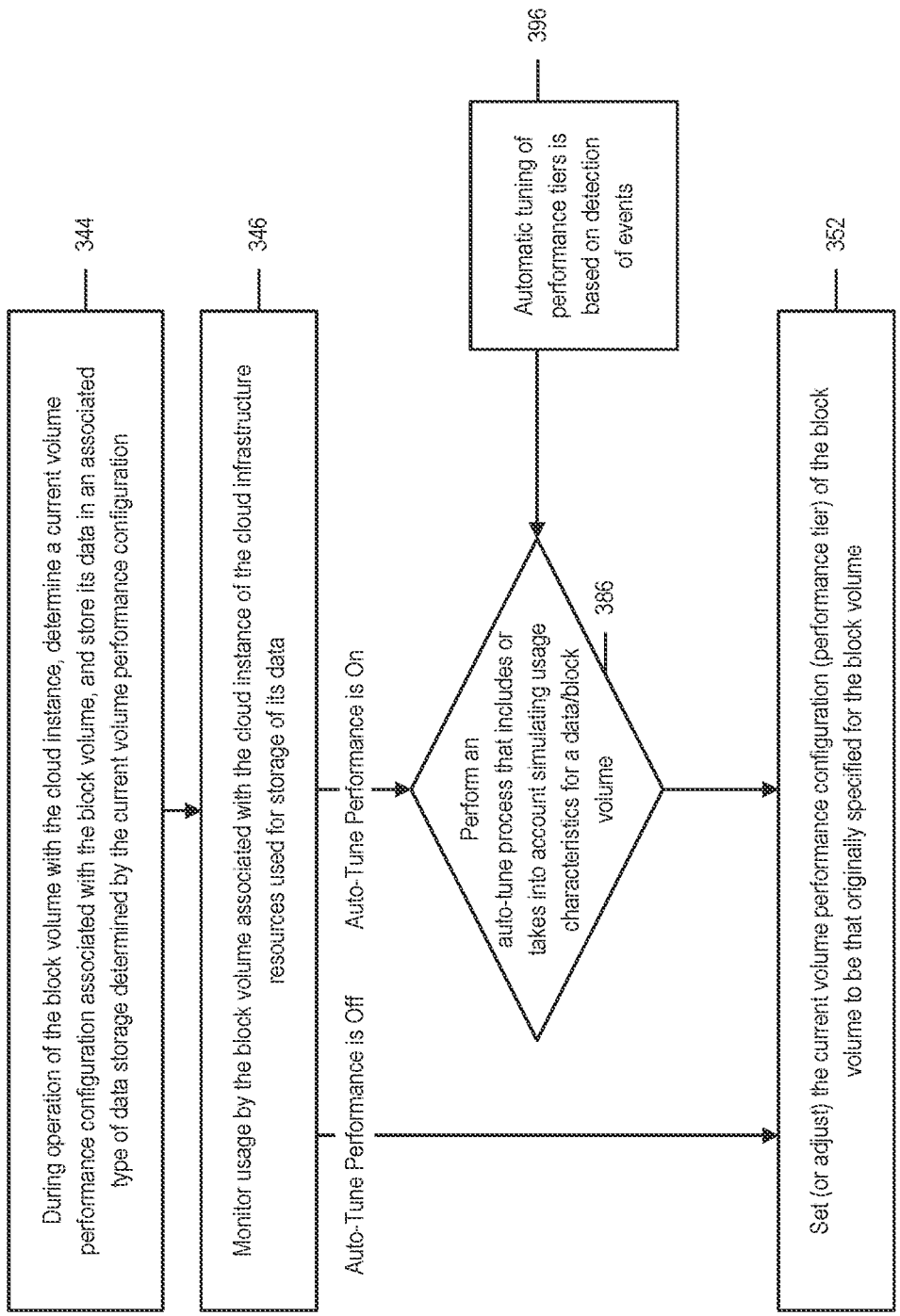
FIG. 30 illustrates a method or process for automatic tuning of performance tiers based on detection of events, in accordance with an embodiment.

FIG. 30 illustrates a method or process for automatic tuning of performance tiers based on detection of events, in accordance with an embodiment.

As illustrated in FIG. 30, in accordance with an embodiment, at steps 344, 346, 352, 386 the process operates as described above.

In accordance with an embodiment, at step 396, when automatic tuning of performance tiers is based on detection of events, the usage monitor can be adapted to determine particular events associated with the usage of a block/volume associated with a cloud instance, for use by the system in providing the automatic tuning of performance tiers.

In accordance with various embodiments, the teachings herein can be implemented using one or more general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing data storage in a cloud infrastructure environment, comprising:
    a cloud infrastructure environment comprising one or more computers having a processor and memory; and
    a data storage service, provided within the cloud infrastructure environment, that provides access to infrastructure resources for storage of data, wherein cloud instances operating within the cloud infrastructure are associated with data volumes that store data for use therewith;
    wherein usage by a cloud instance of its associated data volume is monitored, and the storage of data associated with the data volume is dynamically adjusted, including
        for each extent associated with the cloud instance simulating a caching process associated therewith; and
        in response to simulation of the caching process, dynamically adjusting storage of data associated with the data volume, to meet performance requirements associated with the data volume.

2. The system of claim 1, wherein the system provides access, via a graphical user interface, to configure a particular data volume or block volume with a performance tier, from within a plurality of available performance tiers, to be associated with the data volume or block volume.

3. The system of claim 1, wherein the system is adapted to automatically adjust the storage of data for the data volume or block volume across performance tiers, by allocating storage of data between a first type of data storage associated with a first performance characteristics or performance tier, and a second type of data storage associated with a second performance characteristics or performance tier, based on the data volume or block volume performance configuration.

4. The system of claim 3, wherein the first type of data storage associated with the first performance tier includes solid-state drive (SSD) storage, and wherein the second type of data storage associated with the second performance tier includes hard disk drive (HDD) storage.

5. The system of claim 1, wherein a fraction indicative of the types of data storage by which the data associated with the data volume is stored is dynamically adjusted or tuned to meet the requirements of a volume performance tier.

6. A method for providing data storage in a cloud infrastructure environment, comprising:
    providing, at a cloud infrastructure environment, a data storage service, provided within the cloud infrastructure environment, that provides access to infrastructure resources for storage of data, wherein cloud instances operating within the cloud infrastructure are associated with data volumes that store data for use therewith;
    wherein usage by a cloud instance of its associated data volume is monitored, and the storage of data associated with the data volume is dynamically adjusted, including
        for each extent associated with the cloud instance simulating a caching process associated therewith; and
        in response to simulation of the caching process, dynamically adjusting storage of data associated with the data volume, to meet performance requirements associated with the data volume.

7. The method of claim 6, wherein the system provides access, via a graphical user interface, to configure a particular data volume or block volume with a performance tier, from within a plurality of available performance tiers, to be associated with the data volume or block volume.

8. The method of claim 6, wherein the system is adapted to automatically adjust the storage of data for the data volume or block volume across performance tiers, by allocating storage of data between a first type of data storage associated with a first performance characteristics or performance tier, and a second type of data storage associated with a second performance characteristics or performance tier, based on the data volume or block volume performance configuration.

9. The method of claim 8, wherein the first type of data storage associated with the first performance tier includes solid-state drive (SSD) storage, and wherein the second type of data storage associated with the second performance tier includes hard disk drive (HDD) storage.

10. The method of claim 6, wherein a fraction indicative of the types of data storage by which the data associated with the data volume is stored is dynamically adjusted or tuned to meet the requirements of a volume performance tier.

11. A non-transitory computer readable storage medium, including instructions stored thereon which when read and executed by one or more computers cause the one or more computers to perform a method comprising:

providing, at a cloud infrastructure environment, a data storage service, provided within the cloud infrastructure environment, that provides access to infrastructure resources for storage of data, wherein cloud instances operating within the cloud infrastructure are associated with data volumes that store data for use therewith;

wherein usage by a cloud instance of its associated data volume is monitored, and the storage of data associated with the data volume is dynamically adjusted, including for each extent associated with the cloud instance simulating a caching process associated therewith; and in response to simulation of the caching process, dynamically adjusting storage of data associated with the data volume, to meet performance requirements associated with the data volume.

12. The non-transitory computer readable medium of claim 11, wherein the system provides access, via a graphical user interface, to configure a particular data volume or block volume with a performance tier, from within a plurality of available performance tiers, to be associated with the data volume or block volume.

13. The non-transitory computer readable medium of claim 11, wherein the system is adapted to automatically adjust the storage of data for the data volume or block volume across performance tiers, by allocating storage of data between a first type of data storage associated with a first performance characteristics or performance tier, and a second type of data storage associated with a second performance characteristics or performance tier, based on the data volume or block volume performance configuration.

14. The non-transitory computer readable medium of claim 13, wherein the first type of data storage associated with the first performance tier includes solid-state drive (SSD) storage, and wherein the second type of data storage associated with the second performance tier includes hard disk drive (HDD) storage.

15. The non-transitory computer readable medium of claim 11, wherein a fraction indicative of the types of data storage by which the data associated with the data volume is stored is dynamically adjusted or tuned to meet the requirements of a volume performance tier.

\* \* \* \* \*

UNITED STATES PATENT AND TRADEMARK OFFICE
CERTIFICATE OF CORRECTION

PATENT NO.         : 11,770,451 B2
APPLICATION NO.    : 17/858770
DATED              : September 26, 2023
INVENTOR(S)        : Portz et al.

It is certified that error appears in the above-identified patent and that said Letters Patent is hereby corrected as shown below:

In the Specification

In Column 13, Line 22, delete "storage" and insert -- storage. --, therefor.

In Column 17, Line 61, delete "control" and insert -- Control --, therefor.

In Column 18, Line 23, delete "setting" and insert -- setting. --, therefor.

In Column 18, Line 49, delete "the" and insert -- The --, therefor.

In Column 19, Line 4, delete "if" and insert -- If --, therefor.

In Column 19, Line 9, delete "if" and insert -- If --, therefor.

In Column 20, Line 7, delete "instance." and insert -- instance). --, therefor.

In Column 23, Line 63, after "system" delete "can then".

In Column 24, Line 14, delete "tiers" and insert -- tiers. --, therefor.

Signed and Sealed this
Twenty-sixth Day of November, 2024

Katherine Kelly Vidal
*Director of the United States Patent and Trademark Office*